United States Patent
Kwak et al.

(10) Patent No.: US 10,454,554 B2
(45) Date of Patent: Oct. 22, 2019

(54) INTERFERENCE MEASUREMENT METHOD AND APPARATUS FOR USE IN MOBILE COMMUNICATION SYSTEM

(71) Applicant: Samsung Electronics Co., Ltd., Gyeonggi-do (KR)

(72) Inventors: Youngwoo Kwak, Gyeonggi-do (KR); Younsun Kim, Gyeonggi-do (KR); Hyojin Lee, Gyeonggi-do (KR); Hyoungju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/709,027

(22) Filed: May 11, 2015

(65) Prior Publication Data

US 2015/0327095 A1 Nov. 12, 2015

(30) Foreign Application Priority Data

May 9, 2014 (KR) .......................... 10-2014-0055567

(51) Int. Cl.
*H04W 24/08* (2009.01)
*H04B 7/0452* (2017.01)
(Continued)

(52) U.S. Cl.
CPC ......... *H04B 7/0621* (2013.01); *H04B 7/0452* (2013.01); *H04B 7/0619* (2013.01); *H04W 24/08* (2013.01); *H04B 17/345* (2015.01)

(58) Field of Classification Search
CPC .. H04B 7/0452; H04B 7/0626; H04B 17/345; H04B 7/0417; H04B 7/0413; H04B 7/0632
See application file for complete search history.

(56) References Cited

U.S. PATENT DOCUMENTS

| 2010/0197330 A1* | 8/2010 | Astely | ................... H04L 5/003 455/507 |
| 2012/0327800 A1* | 12/2012 | Kim | .................. H04W 72/082 370/252 |

(Continued)

FOREIGN PATENT DOCUMENTS

| KR | 1020140039905 | 4/2014 |
| WO | WO 2013/025558 | 2/2013 |
| WO | WO 2014/003458 | 1/2014 |

OTHER PUBLICATIONS

International Search Report dated Aug. 17, 2015 issued in counterpart application No. PCT/KR2015/004612, 3 pages.

*Primary Examiner* — Noel R Beharry
*Assistant Examiner* — Ruihua Zhang
(74) *Attorney, Agent, or Firm* — The Farrell Law Firm, P.C.

(57) ABSTRACT

A base station and a method thereof for acquiring channel status information in a mobile communication system operating in a multiuser multiple-input multiple-output transmission mode are provided. The method includes generating and transmitting, to a terminal, interference measurement configuration information for measuring interference caused by signals transmitted from a serving base station of the terminal to at least one other terminal in the transmission mode; and receiving channel status information generated using the transmitted information from the terminal. The present disclosure relates to a communication method and system for converging a 5th-Generation communication system for supporting higher data rates beyond a 4th-Generation system with a technology for Internet of Things, and may be applied to intelligent services based on the 5G communication technology and the IoT-related technology, such as smart home, smart building, smart city, smart car, (Continued)

900 : eNB does not transmits signal on IMR A such that UE can estimate other cell interference ▨ CRS   ☐ PDSCH
▦ DMRS  ▩ Control Channels connected car, health care, digital education, smart retail, security and safety services.

6 Claims, 20 Drawing Sheets

(51) Int. Cl.
*H04B 17/345* (2015.01)
*H04B 7/06* (2006.01)

(56) References Cited

U.S. PATENT DOCUMENTS

| | | | |
|---|---|---|---|
| 2013/0033998 A1* | 2/2013 | Seo | H04W 24/00 370/252 |
| 2013/0088986 A1* | 4/2013 | Xiao | H04W 72/0426 370/252 |
| 2013/0208604 A1* | 8/2013 | Lee | H04L 25/0226 370/252 |
| 2013/0250788 A1 | 9/2013 | Kim et al. | |
| 2014/0073336 A1* | 3/2014 | Kang | H04L 5/0035 455/452.1 |
| 2014/0086082 A1 | 3/2014 | Kim et al. | |
| 2014/0126402 A1 | 5/2014 | Nam et al. | |
| 2014/0126404 A1 | 5/2014 | Kim et al. | |
| 2014/0160958 A1* | 6/2014 | Astely | H04L 5/003 370/252 |
| 2014/0198750 A1* | 7/2014 | Prasad | H04B 7/0626 370/329 |
| 2014/0198751 A1* | 7/2014 | Prasad | H04B 7/0452 370/329 |
| 2014/0204770 A1* | 7/2014 | Mondal | H04W 24/00 370/252 |
| 2014/0241191 A1* | 8/2014 | Yu | H04L 5/005 370/252 |
| 2015/0063142 A1* | 3/2015 | Kim | H04B 7/024 370/252 |
| 2015/0117355 A1* | 4/2015 | Kim | H04B 7/024 370/329 |
| 2015/0162966 A1* | 6/2015 | Kim | H04B 17/00 370/252 |
| 2016/0119099 A1* | 4/2016 | Kim | H04L 5/0048 370/329 |

* cited by examiner

1100 : eNB transmits $\sum_{j \in C_i^k, j \neq N} P_{i,j}^k \cdot W_{i,j}^k \cdot S_{i,j}^k$ On IMR A such that UE can estimate MU-MIMO interference and other cell interference

CRS   PDSCH

DMRS   Control Channels

INTERFERENCE MEASUREMENT METHOD AND APPARATUS FOR USE IN MOBILE COMMUNICATION SYSTEM

PRIORITY

This application claims priority under 35 U.S.C. § 119(a) to a Korean patent application filed on May 9, 2014 in the Korean Intellectual Property Office and assigned Serial No. 10-2014-0055567, the entire content of which is incorporated herein by reference.

BACKGROUND OF THE INVENTION

1. Field of the Invention

The present invention relates generally to interference measurement, and more specifically, to an interference measurement method and apparatus of a terminal in a mobile communication system including an evolved Node B (eNB) having a plurality of transmit antennas for Multiple-Input Multiple-Output (MIMO) transmission.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, mobile communication systems have evolved to high-speed, high-quality wireless packet data communication systems capable of providing data and multimedia services, in addition the voice-oriented services provided by previous mobile communication systems. Recently, various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined by the Institute of Electrical and Electronics Engineers (IEEE), have been developed to support high-speed, high-quality wireless packet data communication services. In particular, LTE is a communication standard developed to support high speed packet data transmission and to maximize the throughput of the radio communication system with various radio access technologies. LTE-A is the evolved version of LTE designed to improve the data transmission capability.

Typically, LTE base stations and terminals are based on 3GPP Release 8 or 9 while LTE-A base stations and terminals are based on 3GPP Release 10. The 3GPP standard organization is preparing for the next release for more improved performance beyond LTE-A. Herein, the terms 'base station' and 'eNB' are used interchangeably. The existing $3^{rd}$ and $4^{th}$ generation wireless packet data communication systems (such as HSDPA, HSUPA, HRPD, and LTE/LTE-A) adopt Adaptive Modulation and Coding (AMC) and Channel-Sensitive Scheduling techniques to improve the transmission efficiency. AMC allows the transmitter to adjust the data transmission amount (i.e., the amount of data to be transmitted) according to the channel condition. More specifically, the transmitter is capable of decreasing the data transmission amount for poor channel conditions, so as to maintain the received signal error probability at a certain level, and is further capable of increasing the data transmission amount for good channel conditions so as to transmit large amount of information efficiently while maintaining the received signal error probability at an intended level. Meanwhile, the channel sensitive scheduling allows the transmitter to selectively provide services to a user communicating under good channel conditions, from among a plurality of users, so as to increase the system capacity, in contrast to allocating a channel fixedly to serve a single user. This increase in system capacity is referred to as multi-user diversity gain. Both the AMC and channel sensitive scheduling are methods of adopting the best modulation and coding scheme at the most efficient time based on the partial channel status information feedback from the receiver.

When using AMC along with a Multiple Input Multiple Output (MIMO) transmission scheme, it may be necessary to take a number of spatial layers and ranks for transmitting signals into consideration. In this case, the transmitter determines the optimal data rate in consideration of the number of layers for use in MIMO transmission as well as coding rate and modulation scheme.

Recently, research has been conducted to replace Code Division Multiple Access (CDMA) used in the legacy $2^{nd}$ and $3^{rd}$ mobile communication systems with Orthogonal Frequency Division Multiple Access (OFDMA) for the next generation mobile communication system. The 3GPP and 3GPP2 are in the process of standardizing an OFDMA-based evolved system. OFDMA is expected to provide superior system throughput as compared to the CDMA. One of the main factors that allow OFDMA to increase system throughput is the frequency domain scheduling capability. As channel sensitive scheduling increases the system capacity using the time-varying channel characteristic, OFDMA can be used to obtain more capacity gain using the frequency-varying channel characteristic.

FIG. 1 is a graph illustrating time-frequency resources in LTE/LTE-A system.

As shown in FIG. 1, a radio resource for transmission from an evolved Node B (eNB) to a User Equipment (UE) is divided into Resource Blocks (RBs) in the frequency domain and subframes in the time domain.

In the LTE/LTE-A system, an RB generally consists of 12 consecutive carriers and has a bandwidth of 180 kHz. Meanwhile, a subframe generally includes 14 OFDM symbols and spans 1 msec. The LTE/LTE-A system allocates resources for scheduling in units of subframes in the time domain, and in units of RBs in the frequency domain.

FIG. 2 is a diagram illustrating a time-frequency resource corresponding to 1 subframe and 1 RB as a smallest scheduling unit in downlink in an LTE/LTE-A system.

The radio resource depicted in FIG. 2 is of one subframe in the time domain and one RB in the frequency domain. The radio resource includes 12 subcarriers in the frequency domain and 14 OFDM symbols in the time domain, i.e. 168 unique frequency-time positions. In LTE/LTE-A, each frequency-time position is referred to as Resource Element (RE).

The radio resource structured as shown in FIG. 2 can be configured to transmit different types of signals as follows.

1. Cell-specific Reference Signal (CRS): A reference signal is broadcast within a cell at every subframe for use, at all the UEs within the cell, in channel estimation between the eNB and UE, monitoring radio link for validity, and fine tuning of time or frequency at baseband.

2. Demodulation Reference Signal (DMRS): A reference signal is transmitted to a specific UE for use in channel estimation to recover the information carried by Physical Downlink Shared Channel (PDSCH). A DMRS port is precoded along with the PDSCH layer connected thereto for transmission. In order to receive specific layer of PDSCH, the UE receives the DMRS port connected to the corresponding layer for channel estimation and then recovers the information carried on the corresponding layer based on the estimation result.

3. Physical Downlink Shared Channel (PDSCH): A downlink data channel used by the eNB to transmit data to the UE and mapped to REs not used for reference signal transmission in data region of FIG. 2

4. Channel Status Information (CSI)-Reference Signal (RS) (CSI-RS): A reference signal transmitted to the UEs within a cell and used for channel state measurement. Multiple CSI-RSs can be transmitted within a cell.

5. Zero Power CSI-RS (ZP-CSI-RS): A CSI-RS position at which no signal is transmitted 6. Interference Measurement Resource (IMR): CSI-RS positions and one or more of REs A, B, C, D, E, F, G, H, I, and J in FIG. 2 can be configured as IMR. The UE performs interference measurement under the assumption that all the signals received at the REs configured as IMR are interferences.

7. Other control channels (Physical Hybrid-ARQ Indicator Channel), PCFICH (Physical Control Format Indicator Channel), PDCCH (Physical Downlink Control Channel (PHICH), Physical Control Format Indicator Channel (PC-FICH), Physical Downlink Control Channel (PDCCH): These channels are used to provide control information that is necessary for the UE to receive PDCCH and to transmit HARQ ACK/NACK corresponding to uplink data.

In FIG. 2, the CSI-RS can be transmitted at some of the positions marked by A, B, C, D, E, F, G, H, I, and J according to the number of antennas transmitting CSI-RS. Also, the zero power CSI-RS (muting) can be mapped to some of the positions A, B, C, D, E, F, G, H, I, and J. The CSI-RS can be mapped to 2, 4, or 8 REs according to the number of the antenna ports for transmission. For two antenna ports, half of a specific pattern is used for CSI-RS transmission; for four antenna ports, entire of the specific pattern is used for CSI-RS transmission; and for eight antenna ports, two patterns are used for CSI-RS transmission. Meanwhile, the zero power CSI-RS (muting) is always transmitted by pattern. That is, although the muting may be applied to a plurality of patterns, if the muting positions do not match CSI-RS positions, the muting cannot be applied to a part of one pattern. However, if the CSI-RS positions match the zero power CSI-RS (muting) positions, the muting can be applied a part of one pattern.

In FIG. 2, A, B, C, D, E, F, G, H, I, and J may be selectively configured as IMR. When configuring IMR to a specific UE, the UE assumes that the signals received at the REs corresponding to IMR are interference signals. The eNB configures IMR in order for the UE to measure interference strength. More specifically, the UE measures the signal strength at the REs belonging to the IMR configured thereto and regards the signal strength as interference strength.

FIG. 3 is a diagram illustrating radio resource structures of two different eNBs for explaining the concept of IMR.

Referring to FIG. 3, eNB A configures IMR C at some REs assigned to the UE located within cell A. Meanwhile, the eNB B configures IMR J at some REs assigned to UE located within cell B.

The UE located within cell A reports channel status information to the eNB A to receive PDSCH. The UE must measure (noise strength: interference strength: signal energy) on the channel to generate the channel status information. IMR aims to enable the UE to measure interference and noise strength.

If eNB A and eNB B transmit signals simultaneously, they cause interference with respect to each other. More specifically, the signal transmitted by eNB B acts as interference to the UE that receives the signal transmitted by eNB A. Likewise, the signal transmitted by eNB A acts as interference to the UE that receives the signal transmitted by eNB B.

In FIG. 3, the eNB A configures the IMR C to the UE located within cell A in order for the UE to measure the interference caused by the eNB B. The eNB A does not transmit any signal at the IMR C. As a consequence, the signal received by the UE located within the cell A at the IMR C is the signal transmitted by the eNB B, as denoted by reference numbers 300 and 310. More specifically, the UE located within the cell A receives only the signal transmitted by the eNB B and the UE can measure the received signal strength from the eNB B and determine the interference strength caused by the eNB B. Likewise, the eNB B configures the IMR J to the UE located within cell B in order for the UE to measure the interference caused by the eNB A. The eNB B does not transmit any signal at the IMR J. As a consequence, the signal received by the UE located within the cell B at the IMR J is the signal transmitted by the eNB A, as denoted by reference numerals 320 and 330.

By configuring IMR as shown in FIG. 3, it is possible to measure the interference strength caused by other eNBs or transmission points. More specifically, the IMR enables measurement of the strength of interference caused by neighbor cells or transmission points efficiently in a Multi-cell wireless communication system including a plurality of cells or a distributed antenna system. However, using the IMR is not efficient for measuring the strength of Multiuser Multiple-Input Multiple-Output (MU-MIMO) interference.

The LTE system supports MIMO transmission using a plurality of transmit/receive antennas. The MIMO transmission is a technique of multiplexing the information to be transmitted spatially in match with the instantaneous channels formed with a plurality of transmit/receive antennas. Since the MIMO transmission is performed by multiplexing a plurality of data streams spatially on one time-frequency resource, the data rate increases multiple times in comparison to the legacy non-MIMO transmission. LTE Release 11 supports MIMO transmission between up to 8 transmit antennas and up to 8 receive antennas. In this case, up to 8 data streams can be multiplexed spatially such that the maximum data rate increases 8 times in comparison to the legacy non-MIMO scheme.

Typically, MIMO transmission is classified into one of Single User-MIMO (SU-MIMO) in which multiple spatially-multiplexed data streams are transmitted to one UE and Multiuser-MIMO (MU-MIMO) in which multiple spatially-multiplexed data streams are transmitted to a plurality of UEs. In a SU-MIMO mode, the spatially multiplexed data streams are transmitted to one UE. Meanwhile, in a MU-MIMO mode, the spatially multiplexed data streams are transmitted to multiple UEs. In the MU-MIMO mode, the eNB transmits a plurality of data streams, and each UE receives at least one of the plurality of data streams transmitted by the eNB. Using MU-MIMO is advantageous, especially when the number of transmit antennas of the eNB is greater than the number of receive antennas of the UE. In SU-MIMO transmission, the maximum number of data streams that can be multiplexed spatially is limited to min (a number of transmit antennas of an eNB (NTx)), a number of receive antennas of a UE (NRx)). In the MU-MIMO transmission, the maximum number of data streams that can be multiplexed spatially is limited to min (NTx, (the number of UEs (NMS)*NRx). The IMR configuration shown and described with reference to FIG. 3 is advantageous with respect to measuring the interference strength caused by other eNBs or transmission points efficiently but disadvantageous with respect to measuring the strength of MU-MIMO interference occurring in the same eNB or transmission point.

Typically, the signal received at a UE in a multi-cell mobile communication system can be expressed by an equation as follows.

$$\sum_i \sum_{j \in C_i^k} P_{i,j}^k \cdot h_{i,j}^k \cdot s_{i,j}^k \quad (1)$$

In Equation (1), $P_{i,j}^k$ denotes the transmit power which the $i^{th}$ eNB or transmission point assigns for the $j^{th}$ UE in the $k^{th}$ subframe. $h_{i,j}^k$ denotes a result of combining the radio channels between the $i^{th}$ eNB or transmission point and the $j^{th}$ UE and the antenna precoding for MIMO transmission. $s_{i,j}^k$ denotes the signal transmitted from the $i^{th}$ eNB or transmission point to the $j^{th}$ UE in the $k^{th}$ subframe. $C_i^k$ denotes a set of UEs to which the $i^{th}$ eNB or transmission point allocates downlink resource in the $k^{th}$ subframe. If the number of UE included in $C_i^k$ is 1, the kth eNB or transmission point transmits the signal in the SU-MIMO mode. In view of the $0^{th}$ UE of the $0^{th}$ eNB, equation (1) can be rewritten as follows.

$$P_{0,0}^k \cdot h_{0,0}^k \cdot s_{0,0}^k + \sum_{\substack{j \in C_i^k \\ j \neq 0}} P_{i,j}^0 \cdot h_{i,j}^0 \cdot s_{i,j}^0 + \sum_{i \neq 0} \sum_{j \in C_i^k} P_{i,j}^k \cdot h_{i,j}^k \cdot s_{i,j}^k \quad (2)$$

In Equation (2), $P_{0,0}^k \cdot h_{0,0}^k \cdot s_{0,0}^k$ denotes the signal component transmitted from the $0^{th}$ eNB to the $0^{th}$ UE, and $$\sum_{i \neq 0} \sum_{j \in C_i^k} P_{i,j}^k \cdot h_{i,j}^k \cdot s_{i,j}^k$$

denotes the interference component caused by other eNBs. The interference components caused by other eNBs $$\sum_{k \neq 0} \sum_{i \in C_i^k} P_{i,j}^k \cdot h_{i,j}^k \cdot s_{i,j}^k$$

can be measured using the IMR configured as shown in FIG. 3. The signal $$\sum_{\substack{j \in C_i^k \\ j \neq 0}} P_{i,j}^0 \cdot h_{i,j}^0 \cdot s_{i,j}^0$$

that the $0^{th}$ eNB transmits to UEs other than the $0^{th}$ UE acts as MU-MIMO interference to the $0^{th}$ UE that receives data from the corresponding eNB. The MU-MIMO interference cannot be measured using the IMR.

It is impossible to measure MU-MIMO interference with IMR, because the eNB incurring the MU-MIMO does not transmit any signal on IMR. Returning to reference to FIG. 3, the eNB A 320 that transmits signals to a plurality of UEs mutes at the IMR C. In this case, a UE that determines channel status information on the downlink of eNB A 320 can measure the interference incurred by the eNB B 350 at the IMR C, but cannot measure the MU-MIMO interference incurred in the eNB A 320.

If the eNB performs MU-MIMO transmission to a plurality of UEs in a state in which the target UE cannot measure the MU-MIMO interference accurately to determine the channel status information, it is difficult to obtain optimized system performance, because the eNB cannot perform link adaptation effectively. Link adaptation is a technique of allocating data rate in adaptation to the channel condition of the UE and, in the mobile communication system such as LTE, link adaptation is performed based on the channel status information transmitted by the UE. If the UE fails in measuring MU-MIMO interference and thus the channel status information transmitted to the UE is not appropriate for MU-MIMO operation, this failure makes it difficult to perform effective link adaptation.

The performance degradation occurring due to the failure to reflect the influence of the MU-MIMO interference to the channel station information is significant, especially in a mobile communication system performing the MU-MIMO transmission to a plurality of UEs, such as Massive MIMO or Full Dimension MIMO (FD-MIMO) system.

In a Massive MIMO or Full Dimension MIMO system, an eNB is provided with a few dozen or a few hundred transmit antennas. In order to improve the system performance, it is necessary to increases the number of data streams to be multiplexed, in contrast to the legacy LTE system. The mobile communication system supporting the FD-MIMO is capable of transmitting signals to a plurality of UEs simultaneously in the MU-MIMO transmission mode to achieve the above aim.

FIG. 4 is a diagram illustrating an eNB supporting FD-MIMO transmission.

Referring to FIG. 4, an eNB includes a set of a plurality of transmit antennas 400 and transmits signals to a plurality of UEs using respective transmit antennas 410, as denoted by reference numerals 420 and 430.

In FIG. 4, the transmit antennas 400 are configured in the form of a 2-Dimensional (2D) antenna array panel, and individual antennas are arranged at an interval corresponding to a function of wavelength, as denoted by reference number 410. The eNB performs high order MU-MIMO transmission to a plurality UEs. High order MU-MIMO is a technique of allocating spatially distributed transmission beams to a plurality of UEs to transmit data, using the plurality of transmit antennas of the eNB. The high order MU-MIMO transmission is performed on the same time-frequency resource, so as to dramatically improve the system throughput.

FIG. 5 is a diagram illustrating downlink transmission at an eNB and uplink transmission of the channel status information at a UE in the time domain in a conventional system.

Referring to FIG. 5, the downlink transmission of the eNB includes DL subframes with IMR 500, 520 and 550, DL subframes with CSI-RS 510, 530, and 560, and DL a subframe with aperiodic CSI trigger 540; and the uplink transmission of the UE includes UL subframes with periodic CSI 570 and 580 and an uplink subframe with aperiodic CSI 590.

As shown in FIG. 5, the eNB configures the frame, such that the IMR is transmitted in subframes 500, 520, and 550 at a regular interval. More specifically, the eNB instructs the UE to measure interference on the IMR in the corresponding subframes through high layer signaling. If the instruction is received, the UE measures interference on the corresponding IMR to generate channel status information. The eNB also transmits CSI-RS in the subframes 510, 530, and 560 and notifies the UE of this transmission through higher layer signaling. If the notification is received, the UE receives CSI-RS in the corresponding subframes to generate channel status information. Typically, the UE measures $$\frac{E_s}{N_o + I_o}$$

to generate the channel status information ($N_o$: strength of noise, $I_o$: strength of interference, and $E_s$: signal energy). The UE measures the noise strength $N_o$ and the interference strength $I_o$ with IMR and the signal energy $E_s$ with CSI-RS. In FIG. 5, the UE generates the channel status information using the noise and interference strength measured on the IMR and the signal energy measured with the CSI-RS. The channel status information is classified into one of periodic channel status information that the UE reports periodically and aperiodic channel status information that the UE reports in response to a request from the eNB. The period channel status information is reported periodically at an interval configured through higher layer signaling from the eNB. The aperiodic channel status information is the channel status information which the UE reports to the eNB only when the eNB requests the UE for channel information using an aperiodic feedback indicator included in the Downlink Control Information (DCI) for Uplink Data Scheduling of the corresponding UE.

In LTE Release 11, the aperiodic feedback indicator is 1-bit or 2-bit information included in the UL DCI format 0 or DCI format 4. When using the 1-bit feedback indicator, if the aperiodic feedback indicator is set to ON, the UE transmits the channel information indicating 'serving cell c' to the eNB through aperiodic PUSCH feedback. Here, transmitting channel information of 'serving cell c' is used to indicate the downlink Component Carrier (CC) carrying DCI in the Carrier Aggregation (CA) situation. When using the 2-bit feedback indicator, the UE performs the aperiodic feedback, as defined in Tables 1-1 and 1-2.

TABLE 1-1 aperiodic feedback method using 2-bit aperiodic feedback indicator (CSI Request Field) in Transmission Mode 10

| Value of CSI Request Field | Description |
| --- | --- |
| '00' | No aperiodic CSI report is triggered |
| '01' | Aperiodic CSI report is triggered for a set of CSI process(es) configured by higher layers for serving cell c |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

TABLE 1-2 aperiodic feedback method using 2-bit aperiodic feedback indicator (CSI Request Field) in Transmission Modes 1-9

| Value of CSI Request Field | Description |
| --- | --- |
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

In Tables 1-1 and 1-2, 'serving cell c' denotes the downlink CC linked to the uplink CC which the Carrier Indication Field (CIF) included in the DCI for Uplink Scheduling, unlike the 1-bit aperiodic feedback indicator. More specifically, if the aperiodic feedback indicator set to '01' is received, the UE transmits the feedback information about the downlink CC linked to the uplink CC indicated by the CIF. If the received aperiodic feedback indicator is set to '10' or '11,' the UE transmits the feedback information about the downlink CC configured through higher layer signaling in association with the uplink CC indicated by the CIF.

In FIG. 5, the channel status information that the UE reports to the eNB, as denoted by reference number 570 and 580 is the periodic channel status information. The UE measures the signal energy and the noise and interference strength at the respective CSI-RS and IMR positions to generate the channel status information transmitted as denoted by reference number 570 and 580. Also, the UE measures the signal energy and the noise and interference strength at the CSI-RS and IMR positions to generate the aperiodic channel status information transmitted, as denoted by reference number 590. In conventional technology, the UE cannot reflects the MU-MIMO interference to the periodic and aperiodic channel status information so as to cause performance degradation in the system operating based on the high order MU-MIMO such as FD-MIMO system.

The MU-MIMO interference may change in size and other characteristics according to the combination of the UEs for the MU-MIMO transmission.

FIG. 6 is a diagram illustrating subframes transmitted by the eNB in the MU-MIMO transmission mode.

Referring to FIG. 6, the eNB may transmit a signal precoded with $w^k_{i,j}$ at the transmit power of $P^k_{i,j}$ to a set $C_i^k$ of UEs including UE j in the $k^{th}$ subframe.

FIG. 6 shows that the eNB performs MU-MIMO transmission to different combinations of UEs in each subframe. For example, the eNB i performs MU-MIMO transmission to the UEs included in the set $C_i^0$ at subframe 0. Meanwhile, the eNB i performs MU-MIMO transmission to the UEs included in the set $C_i^1$ at subframe 1. The UEs included in a certain set $C_i^k$ at a certain subframe k are determined by the scheduler of the eNB, and may change at each sub frame. Whenever the combination of the UEs changes, the signals to be transmitted to the UEs and UE-specific precodings are changed. The precoding is applied to optimize the weights of the antennas for transmitting the signals to the UEs efficiently. One representative example of precoding is to form a beam in a direction to a specific UE by applying weights to a plurality of antennas.

FIG. 7 is a conceptual diagram illustrating a concept of MU-MIMO interference to a UE when the eNB performs MU-MIMO transmission to a plurality of UEs in a subframe.

Referring to FIG. 7, UEs A, B, C, and D receive a precoded PDSCH signals transmitted by an eNB through radio channels in forms denoted by reference numbers 700, 710, 720, and 730.

The UE A receives the signal transmitted by the eNB in the form as denoted by reference number 700. In FIG. 7, $P_{i,A}^k \cdot h_{i,A}^k \cdot s_{i,A}^k$ denotes the signal received at the UE A as a result that the PDSCH signal precoded by the eNB propagates through a radio channel between the eNB and the UE A. In $P_{i,A}^k \cdot h_{i,A}^k \cdot s_{i,A}^k$, $h_{i,A}^k$ denotes the precoding and influence of the radio channel. In FIG. 7, the UE A experiences the influence of the signals 710, 720, and 730 transmitted from the eNB to other UEs B, C, and D in receiving the signal $P_{i,A}^k \cdot h_{i,A}^k \cdot s_{i,A}^k$ transmitted thereto. If link adaptation is performed in consideration of the strength of such interferences, it is difficult to attain the advantages of MU-MIMO transmission, such as FD-MIMO for the optimization of the system throughput in a mobile communication system.

When using the high order MU-MIMO such as FD-MIMO, it is also important to consider the number of UEs to be scheduled simultaneously. When the eNB operates in the MU-MIMO transmission mode, the number of target UEs as well as the combination of the target UEs varies at every subframe. More specifically, the number of UEs to which the eNB transmits signals in the MU-MIMO mode at the subframe 600 may differ from the number of UEs to which the eNB transmits data at subframe 610.

Typically, the eNB performs downlink transmission at a limited transmit power. Assuming that the maximum allowed transmit power of the eNB is $P_{total}$, $P_{total}$ is divided into the number of UEs for MU-MIMO transmission thereto. In order to accomplish this efficiently, it is necessary for the UE to know the transmit power allocated by the eNB for transmission to the UE. If the UE has no such information, it cannot determine the data rate for receiving downlink data, resulting in degradation of system throughput.

FIG. 8 is a conceptual diagram illustrating the transmit powers allocated for respective UEs and the transmit power of CSI-RS for the UE to generate channel status information when the eNB transmits signals in the MU-MIMO mode.

In FIG. 8, the PDSCH addressed to the UE is transmitted in the MU-MIMO transmission mode. Accordingly, the transmit power of the eNB is divided into the number of UEs. Meanwhile, the transmit power for CSI-RS transmitted in order for the UE to generate channel status information is not necessarily divided. In the example of FIG. 8, if the UE generates the channel status information without awareness that the transmit power of PDSCH is ¼ of the transmit power of the CSI-RS, the reports incorrect channel status information to the eNB, resulting in degradation of MU-MIMO transmission performance.

In order to optimize the throughput of the FD-MIMO system as shown in FIG. 4, the UE must generate the channel status information to be reported to the eNB in consideration of the MU-MIMO interference occurring at the eNB transmitting PDSCH to the UE, as well as the interference incurred by other eNBs. Therefore, there is a need for a MU-MIMO interference measurement method that is capable of allowing the UE to generate accurate channel status information. Also, there is a need for a method of informing the UE of the transmit power of the eNB that is allocated for transmission to the UE in generating the channel status information.

SUMMARY OF THE INVENTION

An aspect of the present invention is to address the above problems and provide at least the advantages described below. Another aspect of the present invention is to provide an interference measurement method and apparatus that is capable of allowing the UE to measure the interference caused by the signal transmitted from the serving eNB to other UEs and reflecting the measured MU-MIMO interference to the channel status information to be reported to the serving eNB.

In accordance with an aspect of the present invention, a channel status information acquisition method performed by a base station information in a mobile communication system operating in a multiuser multiple-input multiple-output transmission mode is provided. The method includes generating interference measurement configuration information for measuring interference caused by signals transmitted from a serving base station of a terminal to at least one other terminal in the multiuser multiple-input multiple output transmission mode; transmitting the generated interference measurement configuration information to the terminal; and receiving channel status information generated using the transmitted interference measurement configuration information from the terminal.

In accordance with another aspect of the present invention, an interference measurement method of a terminal for reporting channel status information in a mobile communication system operating in a multiuser multiple-input multiple-output transmission mode is provided. The method includes receiving interference measurement configuration information for measuring interference caused by signals transmitted from a serving base station of the terminal to at least one other terminal; measuring the interference based on the interference measurement configuration information; generating channel status information using the measured interference; and transmitting the generated channel status information to the base station.

In accordance with another aspect of the present invention, a base station for acquiring channel status information in a mobile communication system operating in a multiuser multiple-input multiple-output transmission mode is provided. The base station includes a transceiver configured to transmit signals to a terminal and receive signals from the terminal; and a controller configured to generate interference measurement configuration information for measuring interference caused by signals transmitted from a serving base station of the terminal to at least one other terminal in the multiuser multiple-input multiple output transmission mode and control the transceiver to transmit the interference measurement configuration information to the terminal and receive channel status information generated using the transmitted interference measurement configuration information from the terminal.

In accordance with still another aspect of the present invention, a terminal for reporting channel status information in a mobile communication system operating in a multiuser multiple-input multiple-output transmission mode is provided. The terminal includes a transceiver configured to transmit signals to a base station and receive signals from the base station; and a controller configured to control the transceiver to receive interference measurement configuration information for measuring interference caused by signals transmitted from a serving base station of the terminal to at least one other terminal, measure the interference based on the interference measurement configuration information, generate channel status information using the measured interference, and control the transceiver to transmit the channel status information to the base station.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE PRESENT INVENTION

Figure 1:
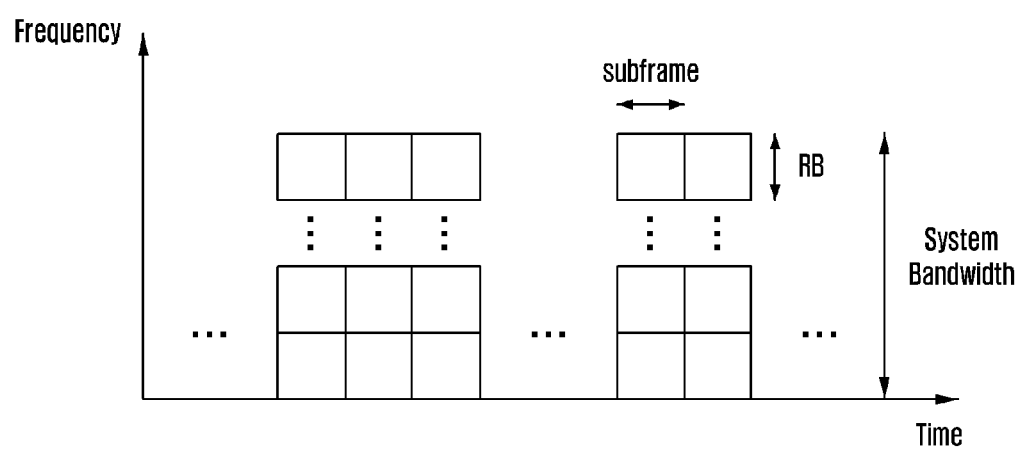
FIG. 1 is a graph illustrating time-frequency resources in LTE/LTE-A system.
Figure 2:
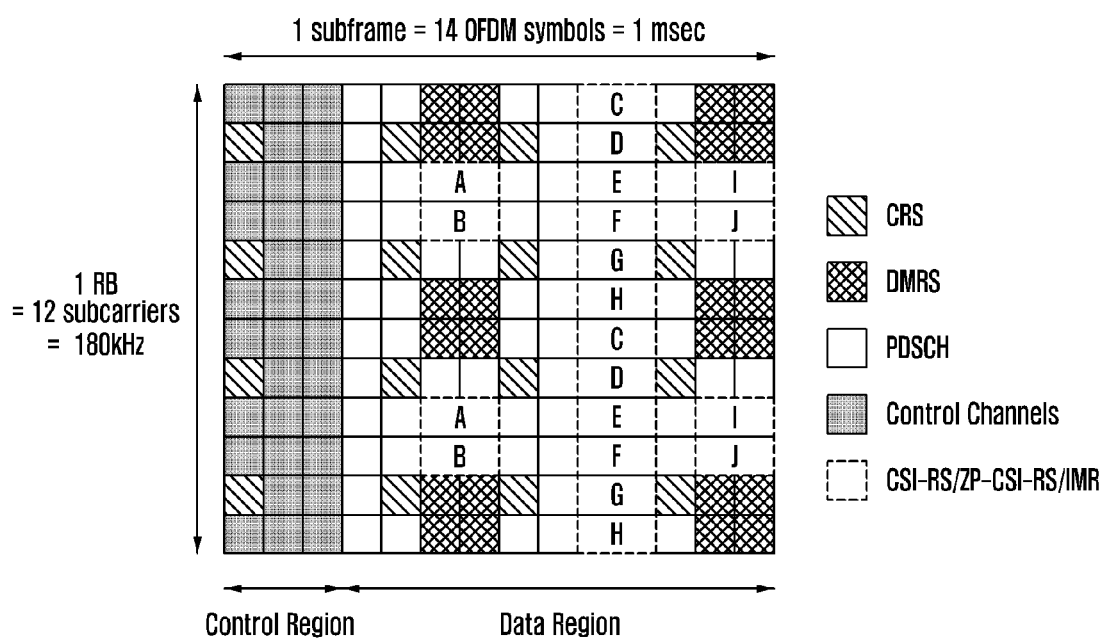
FIG. 2 is a diagram illustrating a time-frequency resource corresponding to 1 subframe and 1 RB as a smallest scheduling unit in downlink in the LTE/LTE-A system.
Figure 3:
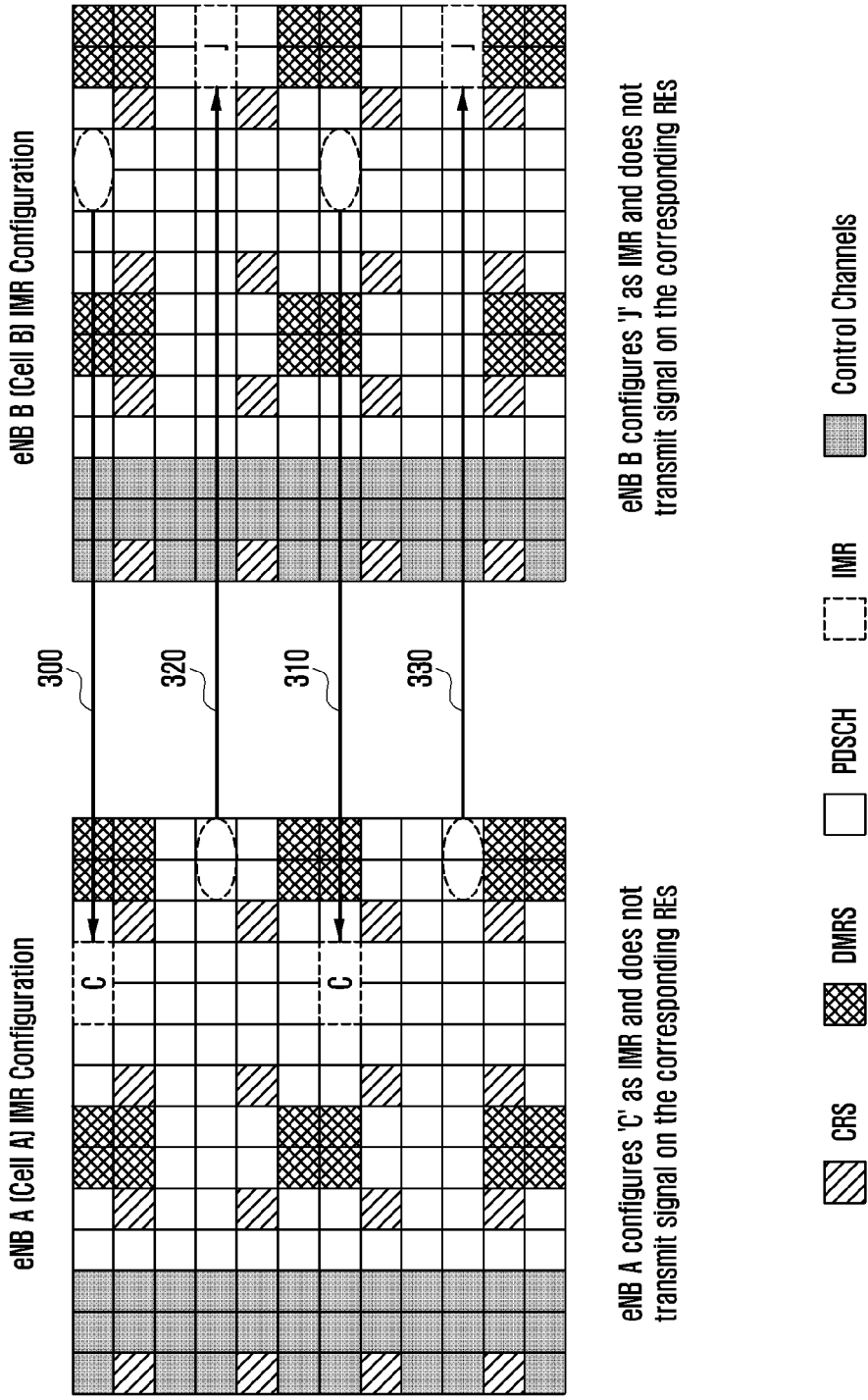
FIG. 3 is a diagram illustrating radio resource structures of two different eNBs for explaining the concept of IMR.
Figure 4:
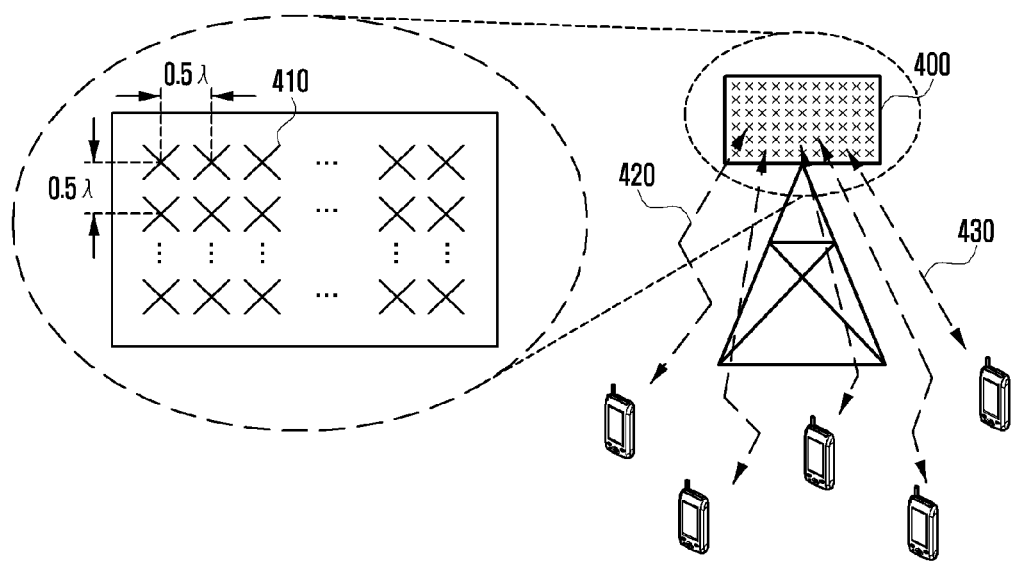
FIG. 4 is a diagram illustrating an eNB supporting FD-MIMO transmission.
Figure 5:
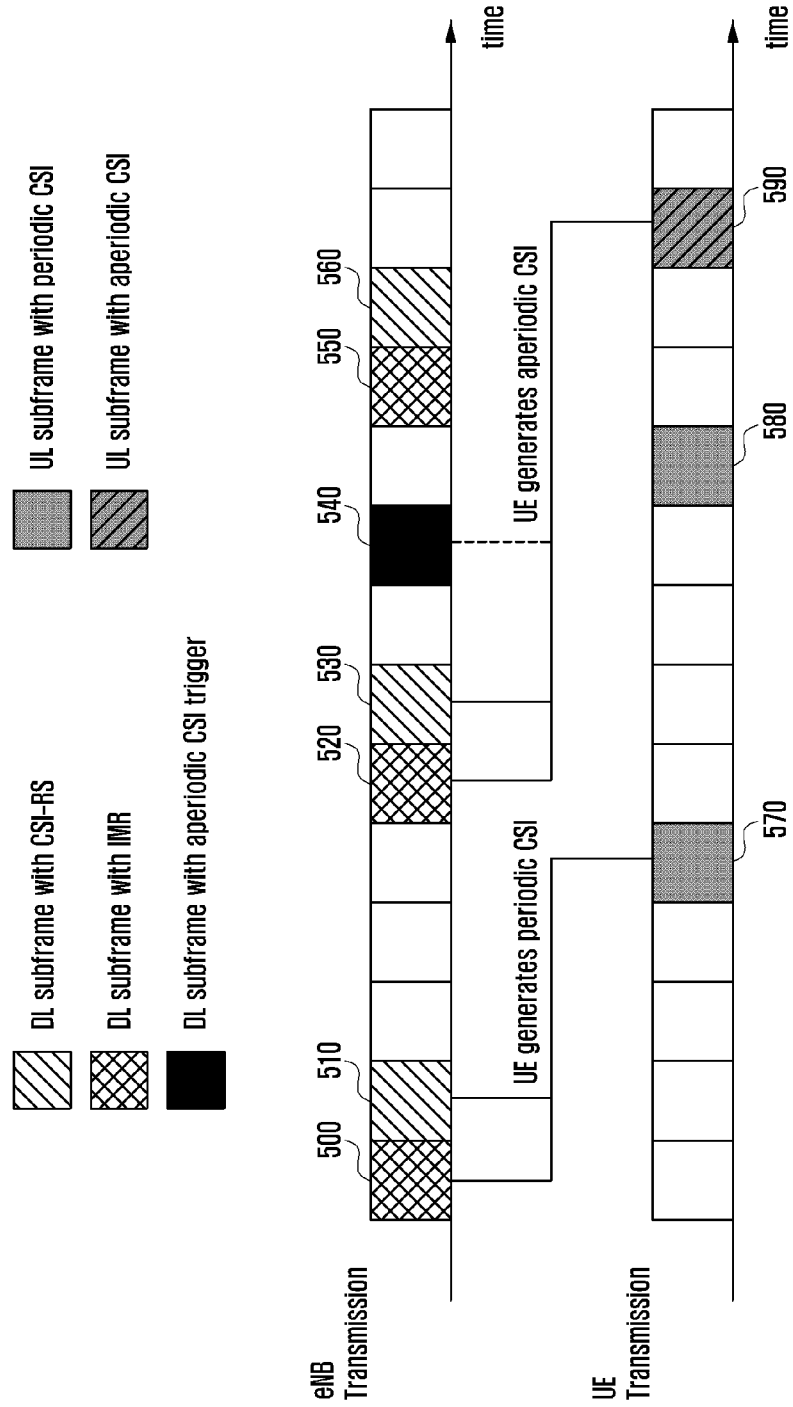
FIG. 5 is a diagram illustrating downlink transmission at an eNB and uplink transmission of the channel status information at a UE in the time domain in the conventional system.
Figure 6:
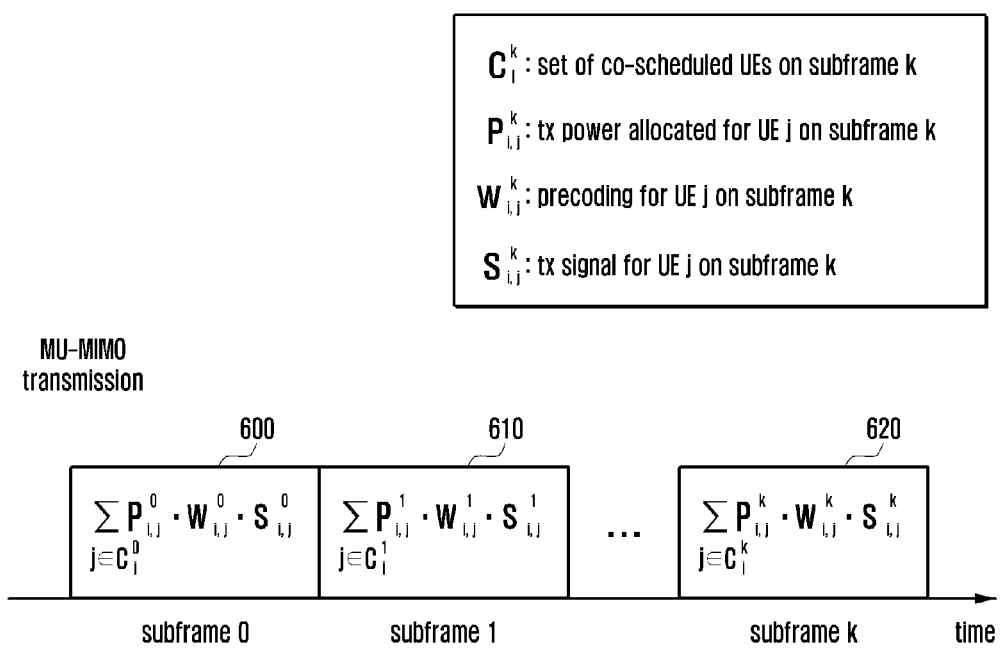
FIG. 6 is a diagram illustrating subframes transmitted by the eNB in the MU-MIMO transmission mode.
Figure 7:
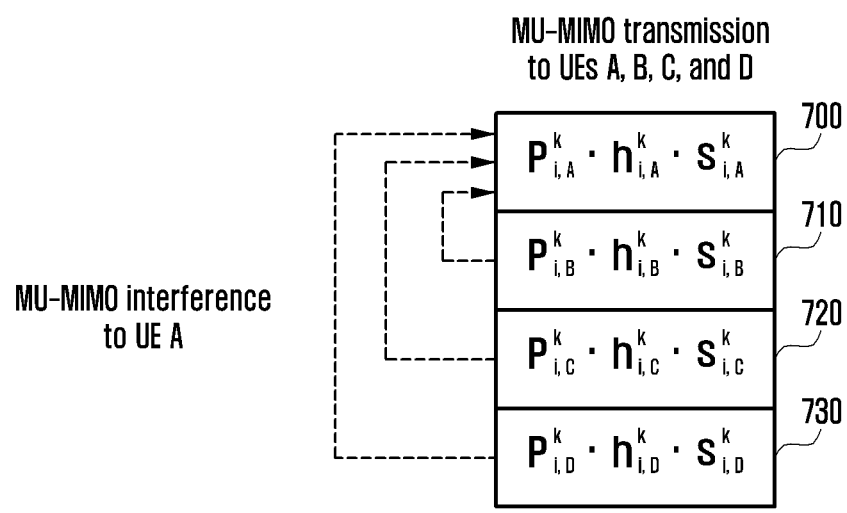
FIG. 7 is a diagram illustrating a concept of MU-MIMO interference to a UE when the eNB performs MU-MIMO transmission to a plurality of UEs in a subframe.
Figure 8:
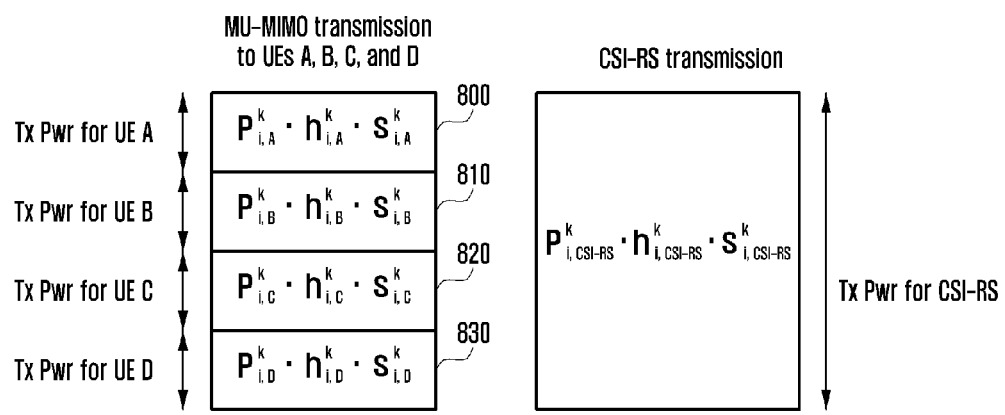
FIG. 8 is a diagram illustrating the transmit powers allocated for respective UEs and the transmit power of CSI-RS for the UE to generate channel status information when the eNB transmits signals in the MU-MIMO mode.

Embodiments of the present invention are described as follows with reference to the accompanying drawings. Detailed descriptions of well-known functions and structures incorporated herein may be omitted to avoid obscuring the subject matter of the present invention. Terms are defined herein in consideration of the functionality in the present invention, and may vary according to the intention of a user or an operator, usage, etc. Therefore, the definitions are made on the basis of the overall content of the present specification.

Some elements are exaggerated, omitted or simplified in the drawings and the elements may have sizes and/or shapes that are different from those shown in drawings, in practice. The same reference numbers are used throughout the drawings to refer to the same or like parts.

Advantages and features of embodiments of the present invention and methods of accomplishing the same may be understood more readily by reference to the following detailed description and the accompanying drawings. The present invention may, however, be embodied in many different forms and is limited to the embodiments set forth herein. Rather, these embodiments are provided as examples to convey concepts of the invention. Like reference numerals may refer to like elements throughout the specification and drawings.

Although the following description is directed to the OFDM-based radio communication system, particularly the 3GPP Evolved Universal Terrestrial Radio Access (EU-TRA), the present invention can be applied to other communication systems having a similar technical background and channel format, with a slight modification, without departing from the spirit and scope of the present invention.

MU-MIMO Interference Measurement Method

An embodiment present invention provides a novel interference measurement method that is capable of measuring MU-MIMO interference for use in generating, at a UE, channel status information for MU-MIMO transmission. MU-MIMO interference is caused by the signals transmitted from the serving eNB of the UE to other UEs. In the LTE Release 11, the system supporting Coordinated Multi-Point transmission and reception configures CSI-Processes to the UEs by means of a centralized controller which controls transmission/reception of a plurality of Transmission Points (TPs). Through the cooperative communication using such CSI-processes, the UE transmits up to 4 radio channel state reports such as Channel Quality Indicator (CQI), Precoding Matrix Indicator (PMI), and Rank Indicator (RI) for the radio channels established with the eNB transmitting downlink data. The UE transmits, to the eNB, the Channel Status Information (CSI) on the channel corresponding to the CSI-RS designated in negotiation with the eNB according to the CSI process configured by the eNB. The UE is aware of the CSI-RS and IMR position per CSI-Process configured by the eNB, so as to check the information on the data signal strength and interference signal strength. It is possible to configure up to three CSI-RS and IMR per UE.

According to an embodiment of the present invention, the IMR corresponding to CSI-Process as one of the information items that the eNB configures to the UE to measure MU-MIMO interference caused by the signals transmitted by the serving eNB of the UE to other UEs is allocated as follows.

Per-CSI-Process IMR definition scheme 1: Define the time-frequency resource corresponding to one IMR to measure interference to the UE.

Per-CSI-Process IMR definition scheme 2: Define the time-frequency resource corresponding to a plurality of IMRs to measure interference to the UE.

According to a method of defining the time-frequency resource corresponding to one IMR to measure interference to the UE (per-CSI-Process IMR definition method) according to an embodiment of the present invention, the eNB defines one IMR per one CSI-Process to the UE for MU-MIMO interference measurement as in the legacy LTE Release 11. The interference measured using the IMR defined for interference to the UE may be computed in such a way of adding the signals transmitted to other UEs as the interference or removing the signal to be received by the UE, according to an embodiment of the present invention.

One IMR-based interference measurement scheme 1: Measure interference by adding the signals addressed to other UEs as interference.

One IMR-based interference measurement scheme 2: Measure interference by removing the signal addressed to the UE.

One IMR-based interference measurement scheme 3: Measure interference using both the one IMR-based interference measurement schemes 1 and 2.

Figure 9:
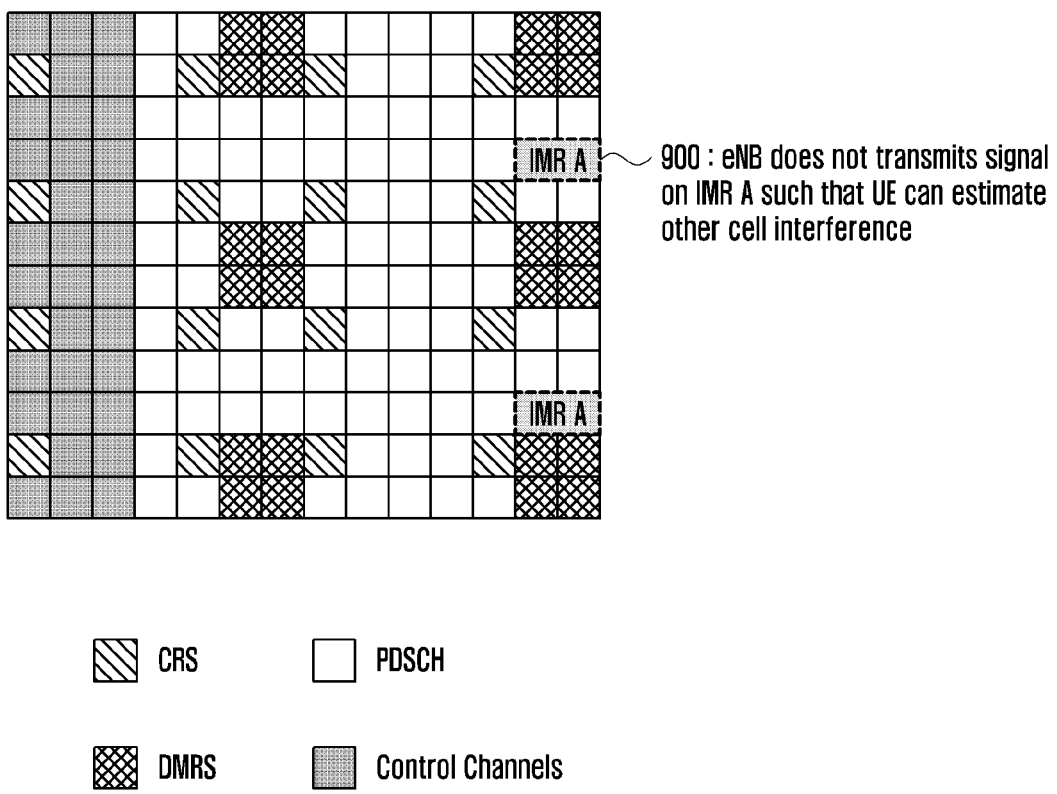
FIG. 9 is a diagram illustrating a method of allocating IMR corresponding to one CSI-Process for measuring interference caused by the signals transmitted from the serving eNB of the UE to other UEs according to an embodiment of the present invention.

FIG. 9 is a diagram illustrating a method of allocating IMR corresponding to one CSI-Process for measuring interference caused by the signals transmitted from the serving eNB of the UE to other UEs according to an embodiment of the present invention.

Referring to FIG. 9, the eNB is capable of transmitting the signal for the UEs, to which the eNB transmits a PDSCH for MU-MIMO interference measurement at IMR positions using the method of measuring the interference, by adding the signals addressed to other UEs as interference (one IMR-based interference measurement scheme 1).

In FIG. 9, the eNB does not transmit any signal at IMR A 900. Since the eNB does not transmit any signal at IMR A, if the UE receives any signal at IMR A, the received signal is a signal transmitted by another eNB. More specifically, the UE can measure the interference incurred by neighbor eNBs at the IMR A. At this time, if the eNB needs the channel status information for a situation in which MU-MIMO transmission to the UEs belonging to a certain set $C_i^k$, the eNB requests the Mth UE to report the channel status information generated by reflecting the MU-MIMO interference $$\sum_{j \in C_i^k, j \neq M} P_{i,j}^k \cdot w_{i,j}^k \cdot s_{i,j}^k.$$

In $$\sum_{j \in C_i^k, j \neq M} P_{i,j}^k \cdot w_{i,j}^k \cdot s_{i,j}^k,$$

$P_{i,j}^k$ denotes the transmit power which the $i^{th}$ eNB allocates to the $j^{th}$ UE at the $k^{th}$ subframe, and $w_{i,j}^k$ denotes the precoding which the $i^{th}$ eNB applies to the $j^{th}$ UE at the $k^{th}$ subframe. $s_{i,j}^k$ denotes a UE-specific sequence transmitted to request the UE to perform interference measurement. For example, $s_{i,j}^k$ may be a UE-specific scrambling sequence, which the eNB informs the UE of in advance, or determined according to a predetermined rule.

In a method of measuring interference by adding the signals addressed to other UEs as interference (one IMR-based interference measurement scheme 1), the UE measures MU-MIMO interference by generating emulated interference in the course of measuring the interference incurred by neighbor eNBs and generates the channel status information based thereon. For this purpose, it is assumed that the eNB and the UE know a set of precoders for the set of UEs including the corresponding UE. For example, in the case of generating the channel information with the signal $$\sum_{j \in C_i^k, j \neq M} P_{i,j}^k \cdot w_{i,j}^k \cdot s_{i,j}^k$$

as MU-MIMO interference when the MU-MIMO transmission is made to the $m^{th}$ UE, the eNB and UE may share the set of precoders such as $w_{i,j}^k$, $j \in C_i^k$. This procedure can be performed with the precoder set, which is predefined in the standard or shared through Radio Resource Control (RRC) signaling or L1 signaling. The UE can generate the emulated interference when transmitted with the precoders corresponding to $w_{i,j}^k$, $j \in C_i^k$, $j \neq M$ excluding $w_{i,M}^k$ as the precoder to be used by the corresponding UE based on the given precoder set. At this time, the transmit power $P_{i,j}^k$ and sequence $s_{i,j}^k$ can be checked based on the CSI-RS under the assumption that they are identical with those of the corresponding UE. In this way, it is possible to emulate the interference expressed as signal $$\sum_{j \in C_i^k, j \neq M} P_{i,j}^k \cdot w_{i,j}^k \cdot s_{i,j}^k$$

to generate the channel status information.

Figure 10:
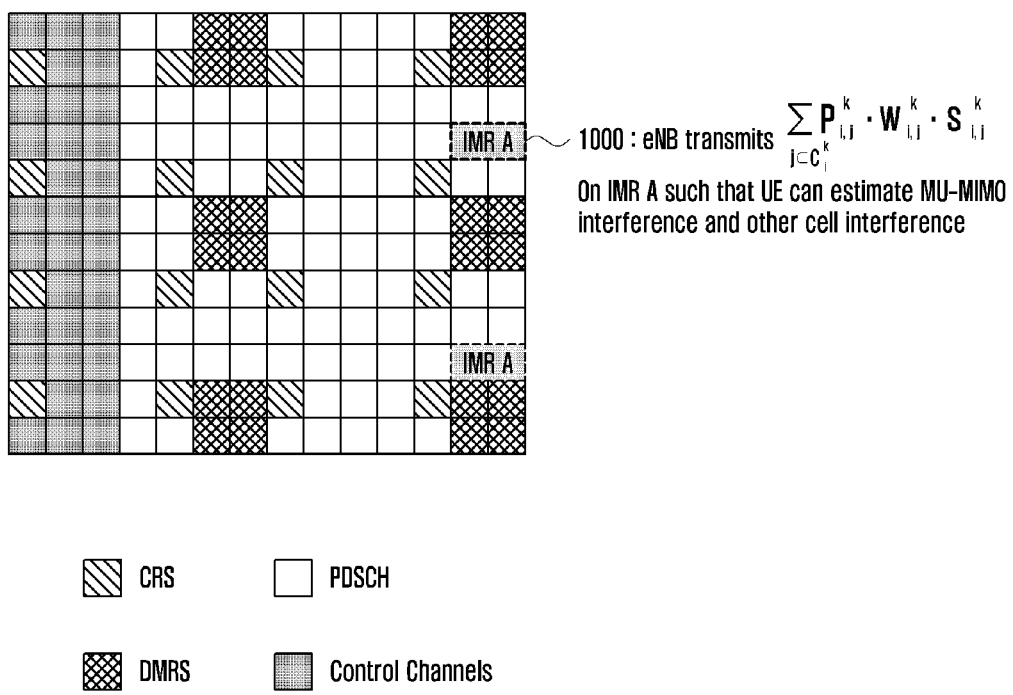
FIG. 10 is a diagram illustrating a method of allocating IMR corresponding to one CSI-Process for measuring interference caused by the signals transmitted from the serving eNB of the UE to other UEs according to another embodiment of the present invention.

FIG. 10 is a diagram illustrating a method of allocating IMR corresponding to one CSI-Process for measuring interference caused by the signals transmitted from the serving eNB of the UE to other UEs according to another embodiment of the present invention.

Referring to FIG. 10, the eNB may transmit a signal for the UEs to which the eNB transmits PDSCH for MU-MIMO interference measurement at IMR positions using a method of measuring the interference by removing the signals addressed to the corresponding UE (one IMR-based interference measurement scheme 2).

In FIG. 10, the eNB transmits the signal corresponding to all UEs belonging to $C_i^k$ at the IMR A. Accordingly, the UE receives both the signal addressed to the UE and signals addressed to the other UEs at IMR A. Thus, the UE is capable of measuring MU-MIMO interference accurately at the IMR A by removing the signal component addressed to the corresponding UEs, so as to generate the accurate channel status information.

In a manner similar to that of the one IMR-based interference measurement scheme 1, if the eNB needs the channel status information for the case of MU-MIMO transmission to the UEs belonging to a specific set $C_i^k$, the eNB requests the $M^{th}$ UE to report the channel status information generated by reflecting the MU-MIMO interference $$\sum_{j \in C_i^k, j \neq M} P_{i,j}^k \cdot w_{i,j}^k \cdot s_{i,j}^k.$$

At this time, the UE measures MU-MIMO interference using $$\sum_{i \in C_i^k} P_{i,j}^k \cdot w_{i,j}^k \cdot s_{i,j}^k$$

received at IMR A. At this time, it is necessary to notify the corresponding UE that the signal received at IMR A includes the signal addressed to it as well as the signals addressed to other UEs according to a predetermined rule or through a predetermined procedure so as to remove the signal addressed to it. If the signal addressed to the corresponding UE is not removed from the signal received at the IMR A, the signal component addressed to the corresponding UE is regarded as interference, resulting in inaccuracy of MU-MIMO interference.

As described above, the UE must remove only the signal addressed to the UE from the signal received at the IMR, in order to measure accurate MU-MIMO interference. For this purpose, the UE must check the signal component addressed to the UE and remove the signal component addressed to the UE from the signal received at the IMR A. For example, the $M^{th}$ UE generates the channel status information by processing the received signal using Equation (3) as follows.

MU-MIMO Interference Signal:

$$\sum_{\substack{j \in C_i^k \\ j \neq M}} P_{i,j}^k \cdot w_{i,j}^k \cdot s_{i,j}^k = \sum_{j \in C_i^k} P_{i,j}^k \cdot w_{i,j}^k \cdot s_{i,j}^k - P_{i,M}^k \cdot w_{i,M}^k \cdot s_{i,M}^k \quad (3)$$

For this purpose, the $M^{th}$ UE needs the information regarding $P_{i,M}^k$, $w_{i,M}^k$, and $s_{i,M}^k$. More specifically, the UE estimates the signal component addressed to the UE in consideration of the transmit power $P_{i,M}^k$, precoding, radio channel influence $w_{i,M}^k$, and transmitted signal $s_{i,M}^k$ associated with the transmission to the UE, and removes the signal component addressed to the UE from the signal received at IMR B. According to an embodiment of the present invention, $P_{i,M}^k$, $w_{i,M}^k$, and $s_{i,M}^k$ are assumed to remove the signal component addressed to the corresponding UE are expressed as $\hat{P}_{i,M}^k$, $\hat{w}_{i,M}^k$, and $\hat{s}_{i,M}^k$, respectively.

Among the above values, $\hat{s}_{i,M}^k$ is a value predetermined between the UE and the eNB. For example, the UE-specific scrambling sequence may be used. In the LTE/LTE-A system, a sequence generator generates different values depending on the initial state applied thereto. Typically, scrambling randomizes the signal. Accordingly, when the signals addressed to multiple UEs are multiplexed at the IMR A, it is advantageous to transmit the signals scrambled with different scrambling sequences. For this purpose, a method according to an embodiment of the present invention includes configuring the initial state of each UE in accordance with its Radio Network Temporary Identity (RNTI) value. The RNTI is a UE-specific identifier allocated by the eNB for identifying the UEs in the LTE/LTE-A system. When using the sequence predetermined between the eNB and the UE, $\hat{s}_{i,M}^k$ and $s_{i,M}^k$ identical with each other.

As described above, $w_{i,M}^k$ denotes the signal precoded at the eNB having a plurality of antennas for transmission to the corresponding UE and then passed the radio channel. That is, $w_{i,M}^k$ includes the influence of the precoding and radio channel. By taking notice of this influence, the UE determines $\hat{w}_{i,M}^k$ (among $\hat{P}_{i,M}^k$, $\hat{w}_{i,M}^k$, and $\hat{s}_{i,M}^k$) under the assumption that the PMI reported by the UE is applied. More specifically, the UE assumes that the eNB applies the precoding indicated by the PMI that it has reported to the eNB and determines $\hat{w}_{i,M}^k$ by combining the PMI with the value acquired through channel estimation based on the recent CSI-RS. Typically, the channel estimation value acquired through the channel estimation based on the CSI-RS may be very similar to a value of the real channel at the time when the UE measures the MU-MIMO interference. However, the channel estimation value is accurate enough to generate the channel status information. A similar method may be used to remove the signal or interference to the UE that is not co-scheduled according to an embodiment of the present invention.

Meanwhile, $\hat{P}_{i,M}{}^k$ is the information that the eNB sends to the UE. The eNB notifies the UE of the ratio of the transmit power for signal addressed to one UE at the IMR A to the transmit power for transmitting CSI-RS through higher or physical layer signaling. More specifically, the eNB notifies the UE of the ratio between the transmit power allocated for the $M^{th}$ UE ($P_{i,M}{}^k$) and the transmit power for the CSI-RS ($P_{i,CSI-RS}{}^k$) in order for the UE to measure interference in the $i^{th}$ set. For example, the eNB notifies the UE of one of 1, ½, ¼, 18, and 1/16 as the ratio between $P_{i,M}{}^k$ and $P_{i,CSI-RS}{}^k$. If the ratio between $P_{i,M}{}^k$ and $P_{i,CSI-RS}{}^k$ is ⅛, the UE assumes that the signal addressed to the UE is transmitted at ⅛ of the CSI-RS transmit power at the IMR A. Likewise, the eNB notifies the UE of the number of UEs for the MU-MIMO transmission, and the UE assumes the inverse value as the ratio between $\hat{P}_{i,M}{}^k$ and $P_{i,CSI-RS}{}^k$.

Figure 11:
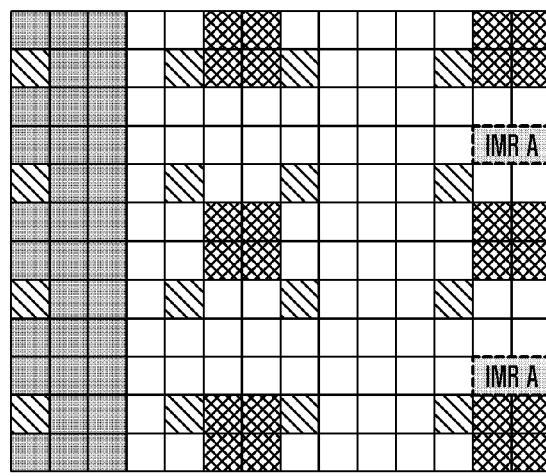
FIG. 11 is a diagram illustrating a method of allocating IMR corresponding to one CSI-Process for measuring interference caused by the signal transmitted from the serving eNB of the UE to other UEs according to another embodiment of the present invention.
Figure 11:
Figure 11:
Figure 11:
Figure 11:

FIG. 11 is a diagram illustrating a method of allocating IMR corresponding to one CSI-Process for measuring interference caused by the signal transmitted from the serving eNB of the UE to other UEs according to another embodiment of the present invention.

Referring to FIG. 11, the eNB transmits a signal for the UEs to which the eNB transmits PDSCH for MU-MIMO interference measurement at IMR positions using the method of measuring the interference with both of the One IMR-based interference measurement schemes 1 and 2 (i.e., One IMR-based interference measurement scheme 3).

In FIG. 11, the eNB transmits the signal corresponding to some of the UEs belonging to $C_i^k$ together, with the signal addressed to the $M^{th}$ UE at IMR A 1100. Then the UE receives the signal addressed to the UE and a part of the signals addressed to other UEs as interference at the IMR A. In order to generate channel information with accurate MU-MIMO interference at the IMR A, the UE removes the signal component addressed to the UE from the received signal and takes additional MU-MIMO interference into consideration.

Like the One IMR-based interference measurement schemes 1 and 2, if the eNB needs the channel status information for a situation in which MU-MIMO transmission to the UEs belong to a specific set $C_i^k$, the eNB requests the $M^{th}$ UE to report the channel status information generated by reflecting the MU-MIMO interference $$\sum_{j \in C_i^k, j \neq M} P_{i,j}^k \cdot w_{i,j}^k \cdot s_{i,j}^k.$$

At this time, the UE measures MU-MIMO interference using $$\sum_{j \in C_i^k, j \neq N} P_{i,j}^k \cdot w_{i,j}^k \cdot s_{i,j}^k$$

received at IMR A. At this time, it is necessary to notify the corresponding UE that the signal received at IMR A includes the signal addressed to it as well as the signals addressed to other UEs and the additional MU-MIMO interference should be considered according to a predetermined rule or through a predetermined procedure, so as to add or remove the signal addressed to the UE. If the signal addressed to the corresponding UE is removed from the signal received at the IMR A, and if the additional MU-MIMO interference is not considered, the signal component addressed to the corresponding UE is regarded as interference, resulting in inaccuracy of MU-MIMO interference.

As described above, the UE must remove the signal addressed to the UE from the signal received at the IMR to measure accurate MU-MIMO interference. For this purpose, the UE must check the signal component addressed to the UE and remove this signal component from the signal received at the IMR A. For example, the $M^{th}$ UE generates the channel status information by processing the received signal using Equation (4) as follows.

MU-MIMO Interference Signal:

$$\sum_{\substack{j \in C_i^k \\ j \neq M}} P_{i,j}^k \cdot w_{i,j}^k \cdot s_{i,j}^k = \sum_{\substack{j \in C_i^k \\ j \neq N}} P_{i,j}^k \cdot w_{i,j}^k \cdot s_{i,j}^k + \tag{4}$$

$$P_{i,N}^k \cdot w_{i,N}^k \cdot s_{i,N}^k - P_{i,M}^k \cdot w_{i,M}^k \cdot s_{i,M}^k$$

For this purpose, the $M^{th}$ UE needs the information regarding $P_{i,M}{}^k$, $w_{i,M}{}^k$, $s_{i,M}{}^k$ and $P_{i,N}{}^k$, $w_{i,N}{}^k$, $s_{i,N}{}^k$ like the one IMR-based interference measurement schemes 1 and 2. Like the one IMR-based interference measurement scheme 1, the eNB and the UE may share a precoder set $w_{i,N}{}^k$, which is predefined in the standard or shared through Radio Resource Control (RRC) signaling or L1 signaling.

The UE can generate the emulated interference for the case when signal is transmitted with the precoders corresponding to $w_{i,N}{}^k$ as the precoders not included in the interference with the given precoder. At this time, the transit power $P_{i,N}{}^k$ and sequence $s_{i,N}{}^k$ can be checked based on the CSI-RS, under the assumption that the transit power $P_{i,N}{}^k$ and sequence $s_{i,N}{}^k$ are identical with those of the corresponding UE. In this way, the signals $P_{i,N}{}^k \cdot w_{i,N}{}^k \cdot s_{i,N}{}^k$ can be emulated as interference to generate the channel state information. Although the embodiments of the present invention described herein refer to a case in which there is one interference signal, it is also possible to generate the signals of a plurality of UEs as emulated interference as in the one IMR-based interference measurement scheme 1.

In a manner similar to the one IMR-based interference measurement scheme 2, the UE estimates the signal component addressed to the IE in consideration of the transmit power $P_{i,M}{}^k$, precoding, radio channel influence $w_{i,M}{}^k$, and transmitted signal $s_{i,M}{}^k$ associated with the transmission to the UE, and removes the signal component addressed to the UE from the signal received at IMR B. When the eNB and the UE use a predetermined sequence as described in the One IMR-based interference measurement scheme 2, $s_{i,M}{}^k$ can be used. As described above, the UE assumes that the eNB applies the precoding corresponding to the PMI value that the UE has reported and determines the $w_{i,M}{}^k$ by combining the channel estimation value acquired through the channel estimation based on the recent CSI-RS with the precoding. The channel estimation value acquired through the channel estimation based on the CSI-RS may be very similar to a value the real channel at the time when the UE measures the MU-MIMO interference but be accurate enough to generate the channel estimate information.

The per-CSI-Process IMR definition scheme 2 according to an embodiment of the present invention is a method in which the eNB defines a plurality of IMRs in one CSI-Process of the UE to measure the MU-MIMO interference, in contrast to a method according to the legacy LTE Release 11. More specifically, unlike the conventional method of reporting the channel state using one CSI-RS and one IMR, in a method according to an embodiment of the present invention, one CSI-Process is defined with one CSI-RS and a plurality of IMRs, so enable reporting of the channel state reflecting various channel conditions by combining the CSI-RS and the plural IMRs.

Figure 12:
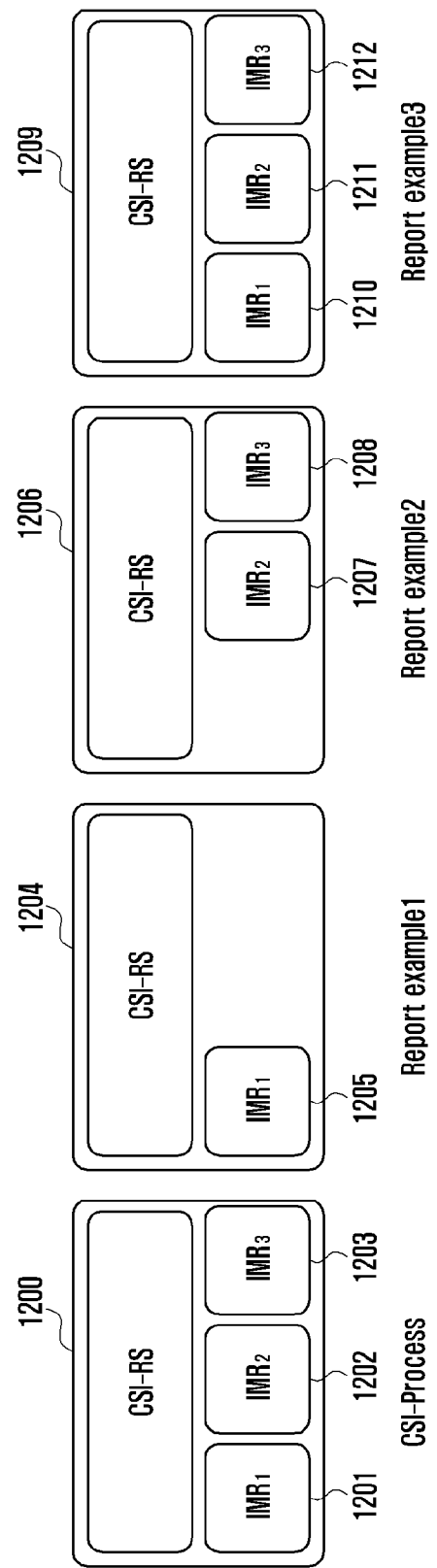
FIG. 12 is a diagram illustrating a concept of channel status information report according to another embodiment of the present invention.

FIG. 12 is a diagram illustrating a concept of channel status information report according to another embodiment of the present invention.

Referring to FIG. 12, one CSI-Process may include one CSI-RS and a plurality of IMRs that are combined differently to report channel status information.

Reference number 1200 denotes an example of a CSI-Process including one CSI-RS and a plurality IMRs. The CSI-Process 1200 includes one CSI-RS and three IMRs 1201, 1202, and 1203. This embodiment of the present invention is directed to scenario in which there are three IMRs. However, embodiments of the present invention may be applied to all scenarios in which there are at least two IMRs. Assuming that the CSI-Process is defined as denoted by reference number 1200, the report example 1 1204 shows reporting of the channel state under the assumption of the CSI-RS as a signal and the power of IMR1 1201 as interference. Assuming that the CSI-Process is defined as denoted by reference number 1200, the report example 2 1206 shows reporting of the channel state under the assumption of the CSI-RS as a signal and the powers of IMR2 1207 and IMR3 1208 as interferences. Likewise, Assuming that the CSI-Process is defined as denoted by reference number 1200, the report example 3 1209 shows reporting of the channel state under the assumption of the CSI-RS as a signal and the powers of IMR1 1210, IMR2 1211, and IMR3 1212 as interference.

When a plurality of IMRs is configured in one CSI-process as above, the channel state can be reported in consideration of the number of scenarios. The embodiment of the present invention according to FIG. 12 is directed to scenarios of using one IMR, two IMRs, and three IMRs representatively, but embodiments of the present invention include all scenarios using combinations of one CSI-RS and a plurality IMRs, in addition to the examples depicted in the drawings.

Figure 13:
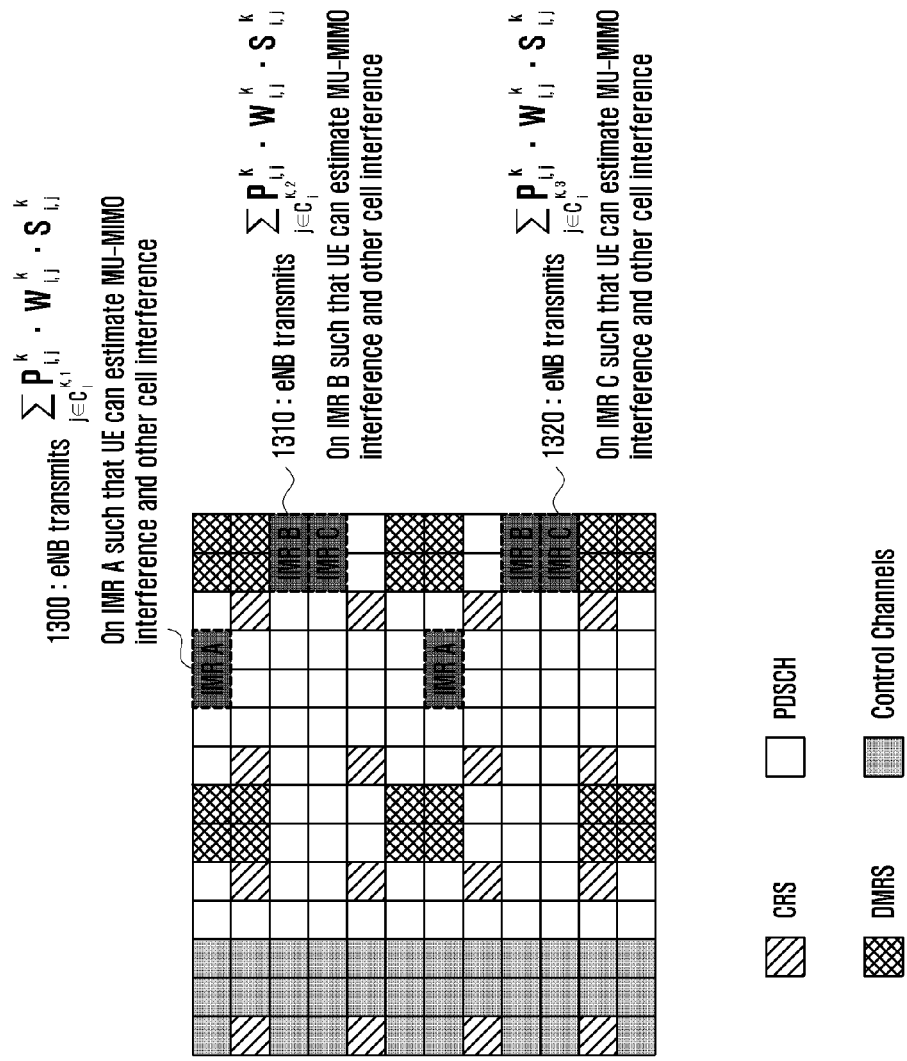
FIG. 13 is a diagram illustrating an IMR configuration for one CSI-Process to measure interference caused by MU-MIMO signals transmitted by the serving eNB of the UE according to another embodiment of the present invention.

FIG. 13 is a diagram illustrating an IMR configuration for one CSI-Process to measure interference caused by MU-MIMO signals transmitted by the serving eNB of the UE according to another embodiment of the present invention.

Referring to FIG. 13, the eNB transmits signals for the UEs, to which a PDSCH is to be transmitted, to the corresponding UEs for MU-MIMO interference measurement at a plurality of IMR positions, based on a definition of the time-frequency resources corresponding to plural IMRs (the per-CSI-Process IMR definition scheme 2) according to an embodiment of the present invention.

In FIG. 13, the eNB measures interference using a plurality of IMRs for one CSI-Process. When the MU-MIMO transmission is performed to the UEs belonging to a specific set of UEs $C_i^k$, the set $C_i^k$ is divided into a plurality of subsets $C_i^{k,1}, C_i^{k,2}, \ldots, C_i^{k,l}$ Here, i denotes the number of subsets of the UEs. The set of the UEs can be divided into subsets by various criteria and, as an example, when co-scheduled, the UEs that provide a relatively small amount of interference with each other are sorted into a subset, while the UEs that provide a significant amount of interference with each other are sorted into another subset. Also, the subsets may be configured such that the UEs, as the elements of the subsets, form an intersection, or do not form any intersection (i.e., a UE may be an element of more than one subset). Although FIG. 13 is directed to an example in which one CSI-Process is associated with three IMRs IMR A 1300, IMR B 1310, and IMR C 1320, embodiments of the present invention are applicable to all cases in which one CSI-Process is associated with at least two IMRs. Also, although, in the example according to FIG. 13, the number of subsets i is identical to the number of IMRs per CSI-Process, the number of subsets may differ from the number of IMRs per CSI-Process in accordance with embodiments of the present invention.

A MU-MIMO interference measurement method using the per-CSI-Process IMR definition scheme 2 proposed according to an embodiment of the present invention, as shown in FIG. 13, is performed as follows. A method proposed for measuring interference using a plurality of IMRs defined for interference measurement of the UE may include selecting at least one of a plurality IMRs.

Multiple IMRs-based interference measurement scheme 1: A UE selects one IMR from among a plurality of IMRs to measure interference and generate channel information.

Multiple IMRs-based interference measurement scheme 2: A UE selects at least two IMRs from among a plurality of IMRs to measure interference and generate channel information.

Figure 14:
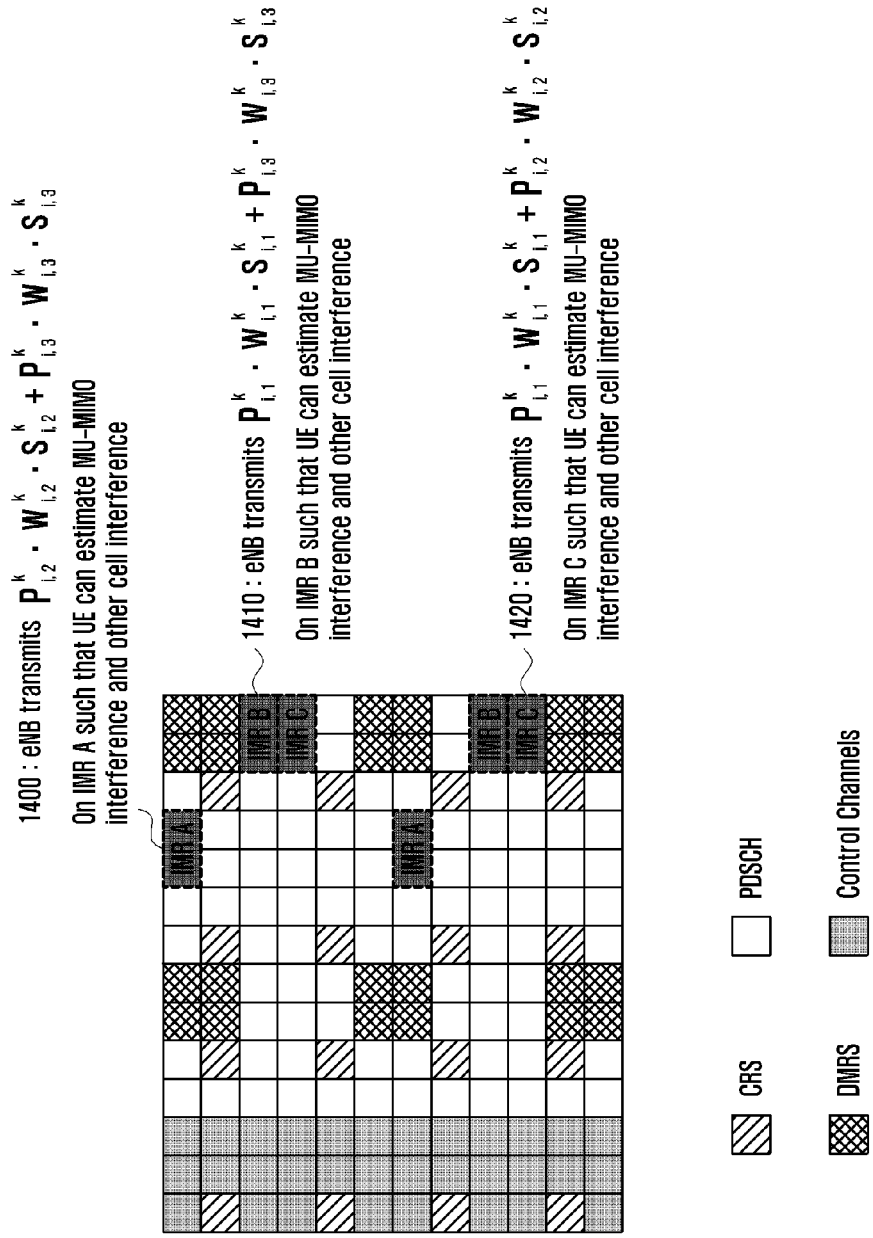
FIG. 14 is a diagram illustrating an IMR configuration for one CSI-Process to measure interference caused by MU-MIMO signals transmitted by the serving eNB of the UE according to another embodiment of the present invention.

FIG. 14 is a diagram illustrating an IMR configuration for one CSI-Process to measure interference caused by MU-MIMO signals transmitted by the serving eNB of the UE according to another embodiment of the present invention.

Referring to FIG. 14, the eNB transmits signals for the UEs to which a PDSCH is to be transmitted to corresponding UEs for MU-MIMO interference measurement, according to interference measurement at one IMR selected among the plural IMRs (multiple IMRs-based interference measurement scheme 1) according to an embodiment of the present invention.

In FIG. 14, the eNB measures interference using a plurality of IMRs associated with one CSI-Process. In this example, the eNB distinguishes among the frequency-time resources of IMRs 1400, 1410, and 1420 arranged as shown in FIG. 14 for MU-MIMO interference measurement to transmit, when MU-MIMO transmission is performed to one of the subsets $C_i^{k,1}$, $C_i^{k,2}$, and $C_i^{k,3}$, interference signals to the UEs belonging to the corresponding subset. In FIG. 14, it is assumed that a set $C_i^k$ includes UE 1, UE 2, and UE 3, and the subsets $C_i^{k,1}$, $C_i^{k,2}$, and $C_i^{k,3}$ include UE 2 and UE 3, UE 1 and UE 3, and UE 1 and UE 2, respectively, for explanation convenience. The subsets are not required to be configured in this manner. If the eNB requires the channel information in a scenario in which the UE 1 is co-scheduled with the UE 2 and UE 3, the eNB instructs the UE 1 to generate the channel information based on $P_{i,2}^k \cdot w_{i,2}^k \cdot s_{i,2}^k + P_{i,3}^k \cdot w_{i,3}^k \cdot s_{i,3}^k$ as MU-MIMO interference to the UE 1 at the IMR A 1300 in consideration of the interferences corresponding to the UE 2 and UE 3. Likewise, the eNB instructs the UE 2 and UE 3 to generate the channel information items based on $P_{i,1}^k \cdot w_{i,1}^k \cdot s_{i,1}^k + P_{i,3}^k \cdot w_{i,3}^k \cdot s_{i,3}^k$ and $P_{i,1}^k \cdot w_{i,1}^k \cdot s_{i,1}^k + P_{i,2}^k \cdot w_{i,2}^k \cdot s_{i,2}^k$ as MU-MIMO interference thereto at the IMR B 1310 and IMR C 1320, respectively. When acquiring the channel information for MU-MIMO operation with the interference measurement scheme of using one of a plurality of IMRs (i.e., multiple IMRs-based interference measurement scheme 1), the greater the number of IMRs configured in association with one CSI-Process is, the greater the number of MU-MIMO environments that are indicated, and thus the accuracy of the channel information increases. However, configuring a large number of IMRs entails overhead and degrades resource utilization efficiency. In the LTE Rel. 11, the number of IMRs for one UE is limited to 3, and configuration of a large number of IMRs is restricted in view of the standard procedure.

In order to overcome the time-frequency resource restriction and supplement the resource utilization efficiency, selection of representative interference at IMRs can be performed. Generation of the channel information necessary for the MU-MIMO operation can be performed in a manner as follows, such as the One IMR-based interference measurement schemes 1, 2, and 3.

First, the signal component addressed to the corresponding UE can be excluded from the interference. Second, the signal component addressed to the corresponding UE can be included in the interference component of the UE if the interference component of the UE is not included in the IMR. Third, the interference component of the UE is removed in the IMR, if the interference component of the UE is transmitted at the IMR, but not co-scheduled from the interference.

When generating the channel information with the interference measured at two or more IMRs selected from among a plurality of IMRs based on the interference measurement scheme of using two or more IMRs selected from among a plurality of IMRs (i.e., multiple IMRs-based interference measurement scheme 2), it is possible to select the IMRs and measure interference at the selected IMRs as follows.

Multiple IMRs-configured at a plurality of IMRs-selective interference measurement scheme 1: Add interferences at a plurality of IMRs to measure interference.

Multiple IMRs-configured at a plurality of IMRs-selective interference measurement scheme 2: Remove interferences at a plurality of IMRs to measure interference.

Multiple IMRs-configured at a plurality of IMRs-selective interference measurement scheme 3: Add or remove interferences at a plurality of IMRs to measure interference.

Figure 15:
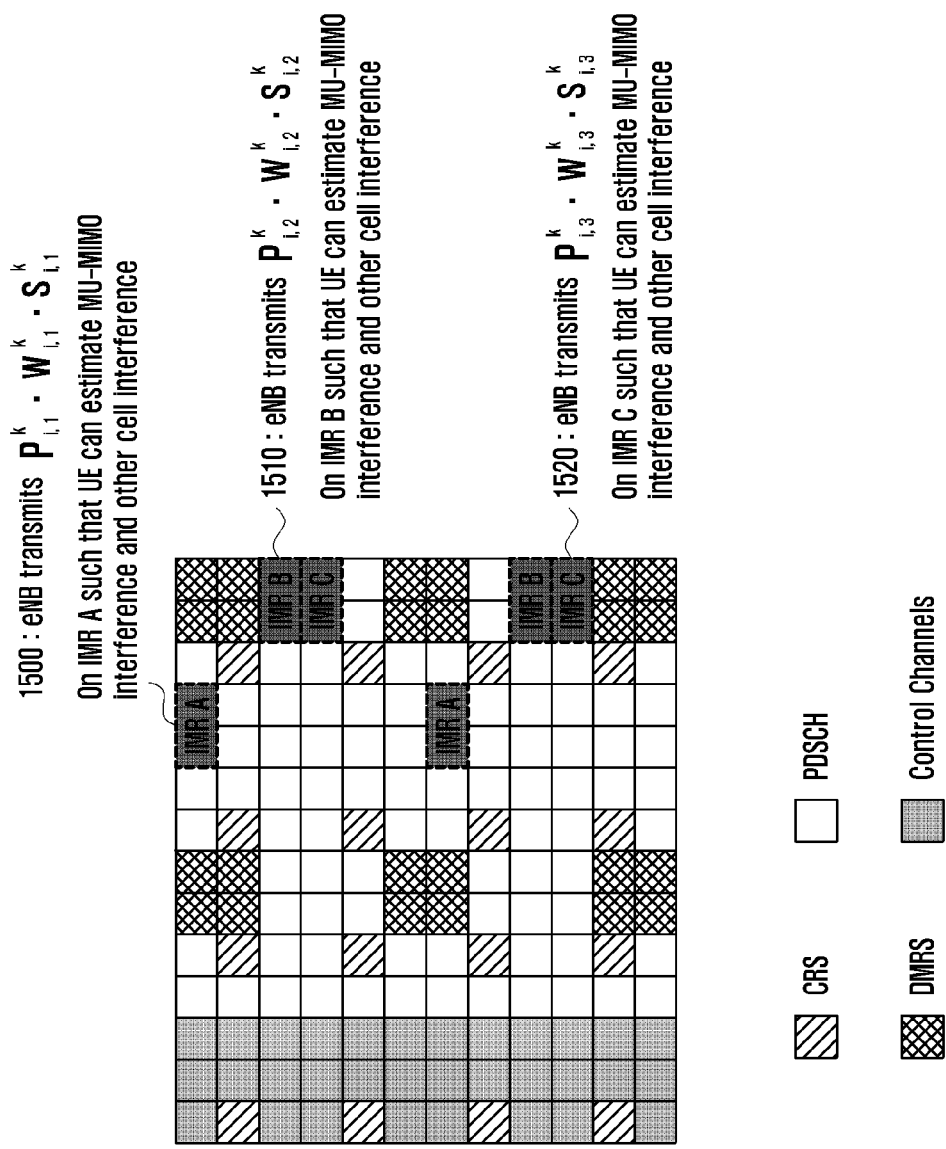
FIG. 15 is a diagram illustrating an IMR configuration for one CSI-Process to measure interference caused by MU-MIMO signals transmitted by the serving eNB of the UE according to another embodiment of the present invention.

FIG. 15 is a diagram illustrating an IMR configuration for one CSI-Process to measure interference caused by MU-MIMO signals transmitted by the serving eNB of the UE according to another embodiment of the present invention.

Referring to FIG. 15, the eNB transmits signals for the UEs to which a PDSCH is to be transmitted to the corresponding UEs for MU-MIMO interference measurement at the IMRs, according to an interference measurement performed in a manner that includes adding interference at a plurality of IMRs among the plurality of IMRs (i.e., multiple IMRs-configured at a plurality of IMRs-selective interference measurement scheme 1) according to an embodiment of the present invention.

In FIG. 15, the eNB measures interference using a plurality of IMRs associated with one CSI-Process. In this example, the eNB distinguishes among the frequency-time resources of IMRs 1500, 1510, and 1520 arranged as shown in FIG. 15 for MU-MIMO interference measurement to transmit, when MU-MIMO transmission is performed to one of the subsets $C_i^{k,1}$, $C_i^{k,2}$, and $C_i^{k,3}$, interference signals to the UEs belonging to the corresponding subset. In FIG. 15, it is assumed that a set $C_i^k$ includes UE 1, UE 2, and UE 3, and the subsets $C_i^{k,1}$, $C_i^{k,2}$, and $C_i^{k,3}$ include UE 1, UE 2, and UE 3, respectively, for convenience of explanation. The subsets are not required to be configured as described above. If the eNB requires the channel status information for a scenario in which the UE 1 is co-scheduled with the UE 2 and UE 3, the eNB instructs the UE 1 to generate the channel information in consideration of the interferences corresponding to the UE 2 and UE 3. When considering both the interferences at IMR B and IMR C, the interference signal corresponding to the UE 2 and UE 3 can be generated according to Equation (5).

MU-MIMO Interference Signal:

$$\sum_{j \in 2,3} P_{i,j}^k \cdot w_{i,j}^k \cdot s_{i,j}^k = P_{i,2}^k \cdot w_{i,2}^k \cdot s_{i,2}^k + P_{i,3}^k \cdot w_{i,3}^k \cdot s_{i,3}^k \quad (5)$$

Likewise, the eNB instructs the UE 2 and UE 3 to calculate $P_{i,1}^k \cdot w_{i,1}^k \cdot s_{i,1}^k + P_{i,3}^k \cdot w_{i,3}^k \cdot s_{i,3}^k$ and $P_{i,1}^k \cdot w_{i,1}^k \cdot s_{i,1}^k + P_{i,2}^k \cdot w_{i,2}^k \cdot s_{i,2}^k$ as the interferences corresponding to UEs 1 and 3 and UEs 1 and 2 in consideration of the interference at the IMRs A and C and IMRs A and B to generate the channel information items, respectively.

When acquiring the channel information for MU-MIMO operation with the interference measurement scheme of using the multiple IMRs-based interference measurement scheme 1, the greater the number of IMRs configured in association with one CSI-Process is, the greater the number of MU-MIMO environments that are indicated, and therefore, the accuracy of the channel information is increased. However, configuring a large number of IMRs entails overhead and degrades resource utilization efficiency. In the LTE Rel. 11, the number of IMRs for one UE is limited to 3, and therefore, configuration of a large number of IMRs is restricted in view of standard procedure. In order to overcome the time-frequency resource restriction and supplement the resource utilization efficiency, selection of representative interference at IMRs can be performed. Generation of the channel information necessary for the MU-MIMO operation can be performed in a manner as follows, such as the One IMR-based interference measurement schemes 1, 2, and 3.

First, the signal component addressed to the corresponding UE can be excluded from the interference. Second, the signal component addressed to the corresponding UE can be included in the interference component of the UE if the interference component of the UE is not included in the IMR. Third, the interference component of the UE is removed in the IMR, if the interference component of the UE is transmitted at the IMR, but not co-scheduled from the interference.

Figure 16:
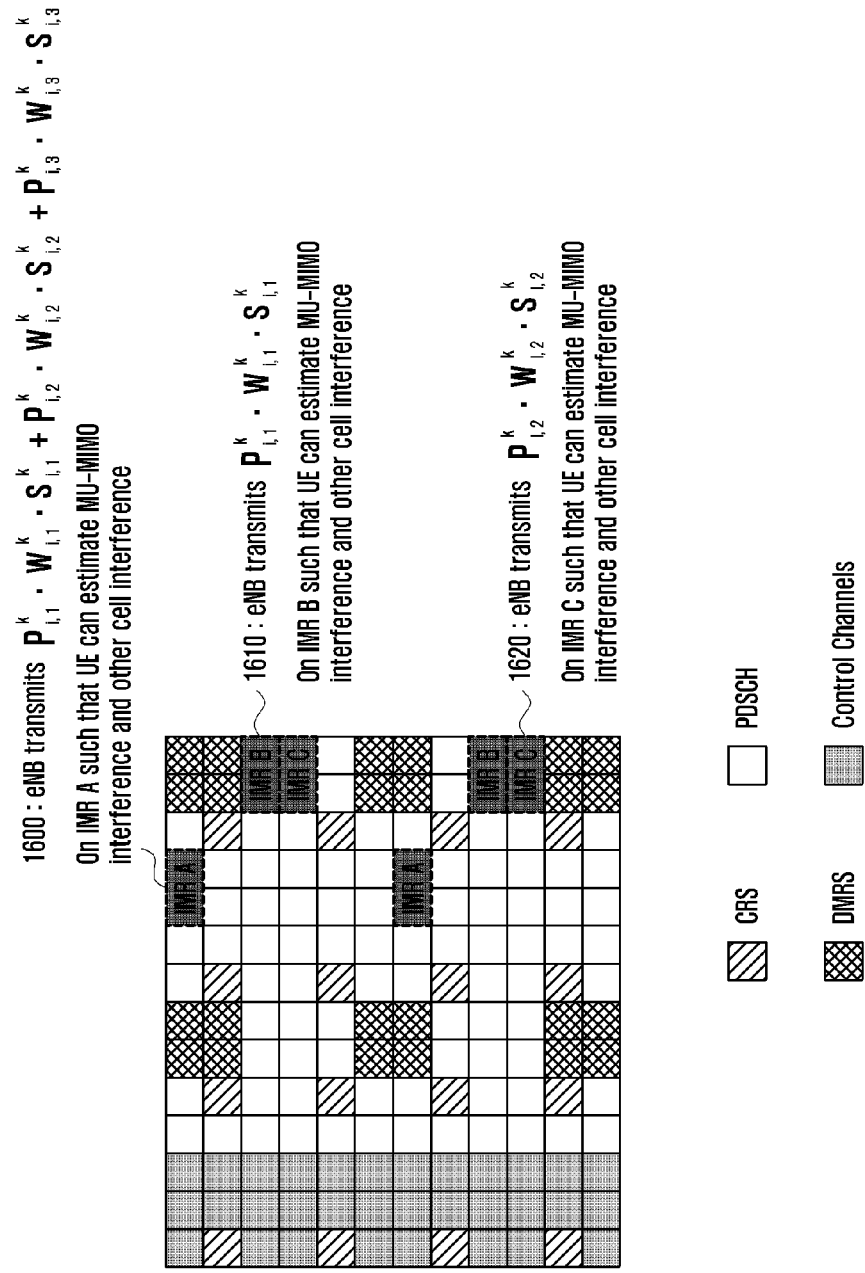
FIG. 16 is a diagram illustrating an IMR configuration for one CSI-Process to measure interference caused by MU-MIMO signals transmitted by the serving eNB of the UE according to still another embodiment of the present invention.

FIG. 16 is a diagram illustrating an IMR configuration for one CSI-Process to measure interference caused by MU-MIMO signals transmitted by the serving eNB of the UE according to still another embodiment of the present invention.

Referring to FIG. 16, the eNB transmits signals for the UEs to which PDSCH is to be transmitted to the corresponding UEs for MU-MIMO interference measurement at the IMRs, according to an interference measurement performed in a manner that includes removing or removing and adding interferences at the plural IMRs (i.e., multiple IMRs-configured at a plurality of IMRs-selective interference measurement schemes 2 and 3) according to an embodiment of the present invention.

In FIG. 16, the eNB measures interference using a plurality of IMRs associated with one CSI-Process. In this example, the eNB distinguishes among the frequency-time resources of IMRs 1600, 1610, and 1620 arranged as shown in FIG. 16 for MU-MIMO interference measurement to transmit, when MU-MIMO transmission is performed to one of the subsets $C_i^{k,1}$, $C_i^{k,2}$, and $C_i^{k,3}$, interference signals to the UEs belonging to the corresponding subset. In the example of FIG. 16, a set $C_i^k$ includes UE 1, UE 2, and UE 3, and the subsets $C_i^{k,1}$, $C_i^{k,2}$, and $C_i^{k,3}$ include UE 1, UE 2, and UE 3, respectively, for convenience of explanation. The subsets are not required to be configured as described above. If the eNB requires the channel status information for an example in which the UE 1 is co-scheduled with the UE 2 and UE 3, the eNB instructs the UE 1 to generate the channel information in consideration of the interferences corresponding to the UE 2 and UE 3. When considering removal of the interference at the IMR B 1610 from the interference at IMR A 1600, the interference signal corresponding to the UE 2 and UE 3 can be generated as Equation (6).

MU-MIMO interference signal:

$$\sum_{j \in 2,3} P_{i,j}^k \cdot w_{i,j}^k \cdot s_{i,j}^k = \sum_{j \in 1,2,3} P_{i,j}^k \cdot w_{i,j}^k \cdot s_{i,j}^k - P_{i,1}^k \cdot w_{i,1}^k \cdot s_{i,1}^k \quad (6)$$

Likewise, the eNB instructs the UE 2 to calculate the interference corresponding to the UEs 1 and 3 by removing the interference at IMR C 1620 from the interference at IMR A 1600 to generate the channel information. In the present example, it is difficult to generate the corresponding interference for all possible scenarios only with the calculation by removing the interferences at the IMR B 1610 and IMR C 1620 from the interference at the IMR A 1600, and therefore, there is a need of a method that includes addition and removal of respective interferences at the plural IMRs using the multiple IMRs-configured plural IMRs-selective interference measurement scheme 3. When generating the channel status information in consideration of the interferences at IMR B 1610 and IMR C 1620 in such a method, the interference signal can be generated as equation (7)

MU-MIMO Interference Signal:

$$\sum_{j \in 1,2} P_{i,j}^k \cdot w_{i,j}^k \cdot s_{i,j}^k = P_{i,1}^k \cdot w_{i,1}^k \cdot s_{i,1}^k + P_{i,2}^k \cdot w_{i,2}^k \cdot s_{i,2}^k \quad (7)$$

When acquiring the channel information for MU-MIMO operation using the multiple IMRs-based interference measurement schemes 2 and 3, the greater the number of IMRs configured in association with one CSI-Process, the greater the number MU-MIMO environments that are indicated, and the accuracy the channel information is increased. However, configuring a large number of IMRs entails overhead and degrades resource utilization efficiency. In the LTE Rel. 11, the number of IMRs for one UE is limited to 3, configuring a large number of IMRs is restricted in view of standard procedures.

In order to overcome the time-frequency resource restriction and supplement the resource utilization efficiency, selection of representative interference at IMRs can be performed. And, generation of the channel information necessary for the MU-MIMO operation can be performed in a manner as follows, such as the One IMR-based interference measurement schemes 1, 2, and 3.

First, the signal component addressed to the corresponding UE can be excluded from the interference. Second, the signal component addressed to the corresponding UE can be included in the interference component of the UE if the interference component of the UE is not included in the IMR. Third, the interference component of the UE is removed in the IMR, if the interference component of the UE is transmitted at the IMR, but not co-scheduled from the interference.

In order to measure interference using the per-CSI-Process IMR definition scheme 1, the information about $P_{i,j}^k$, $w_{i,j}^k$, $s_{i,j}^k$, $j \in C_i^k$, $j \neq M$ corresponding to the interference and $\hat{P}_{i,M}^k$, $\hat{w}_{i,M}^k$, $\hat{s}_{i,M}^k$ corresponding to the signal addressed to the UE are necessary. At the time, the eNB may notify the UE of $\hat{P}_{i,M}^k$ by using a ratio between the transmit power for transmitting the CSI-RS and the transmit power for transmitting a signal to one UE at the IMR A through higher or physical layer signaling. More specifically, the eNB notifies the UE of the ratio between the transmit power $P_{i,M}^k$ allocated to the $M^{th}$ UE at the $i^{th}$ IMR and the transmit power $P_{t,CSI-RS}^k$ for CSI-RS transmission. For example, the eNB sends the UE one of 1, ½, ¼, ⅛, and 1/16 as the ratio between $P_{i,M}^k$ and $P_{i,CSI-RS}^k$. If a ratio between $\hat{P}_{i,M}^k$ and $P_{i,CSI-RS}^k$, which is set to ⅛ is received, the UE assumes that the signal addressed to the UE at the IMR type A is transmitted at the transmit power of ⅛ in comparison to the CSI-RS transmit power. Likewise, the eNB notifies the UE of the number of UEs associated with the MU-MIMO transmission, and the UE assumes that the inverse value thereof as the ratio of $\hat{P}_{i,M}^k$ to $P_{i,CSI-RS}^k$. Likewise, operations can be performed under the assumption that the interference transmit power $P_{i,j}^k$ is equal to the signal transmit power $\hat{P}_{i,M}^k$ for the corresponding UE. As described above, $\hat{s}_{i,M}^k$ may be a value predetermined between the UE and the eNB (e.g., a scrambling sequence determined differently per UE). In the LTE/LTE-A system, a sequence generator generates a value that differs according to the initial state applied to the sequence generator. Typically, scrambling randomizes the signal. The interference sequence $s_{i,N}^k$ can be checked based on the CSI-RS under the assumption that the interference transmit power is identical to the signal transmit power for the corresponding UE. $\hat{w}_{i,M}^k$ is determined by the UE under the assumption that the PMI value which the UE has reported to the eNB is applied. That is, the UE assumes that the eNB applies the precoding indicated by the PMI which the UE has reported to the eNB and determines $\hat{w}_{i,M}^k$ by combining the PMI with the value acquired through channel estimation based on the recent CSI-RS. In the case of the precoder corresponding to the interference, the eNB and the UE may have a set of precoder sets $w_{i,j}^k$, $j \in C_i^k$. This procedure can be performed with the precoder set that is specified in the standard or exchanged through RRC or L1 signaling. The UE may emulate the interference for a scenario in which the signals are transmitted with the precoders corresponding to $w_{i,j}^k$, $j \in C_i^k$, $j \neq M$, with the exception of the precoder $w_{i,M}^k$ for the corresponding UE using the given precoder set.

In order to measure interference using the per-CSI-Process IMR definition scheme 2, the information regarding at least one IMR to be used for the interference measurement and information indicating whether, when multiple IMRs are selected, to add or remove the corresponding interference to or from the previous interference. When using both the per-CSI-Process IMR definition schemes 1 and 2, the information regarding $P_{i,j}^k$, $w_{i,j}^k$, $s_{i,j}^k$, $j \neq C_i^k$, $j \neq M$ corresponding to the interference and $\hat{P}_{i,M}^k$, $\hat{w}_{i,M}^k$, $\hat{s}_{i,M}^k$ corresponding to the signals addressed to the UE is further required.

The UE can acquire the signal and interfering PMI and IMR information using the following schemes.

PMI and IMR information acquisition scheme 1: This scheme may be specified in the standard.

PMI and IMR information acquisition scheme 2: The information is shared through RRC signaling.

PMI and IMR information acquisition method 3: Map corresponding information to aperiodic CSI trigger table through RRC signaling and transfer corresponding information through aperiodic CSI trigger based on corresponding information.

PMI and IMR information acquisition method 4: Transfer the information through dynamic signaling.

Tables 2-1 and 2-2 depict examples according to a rule of configuring interfering PMI and IMR for explaining a method of acquiring PMI and IMR information predefined in the standard (PMI and IMR information acquisition scheme 1).

TABLE 2-1

Example rule for an interference precoder $\hat{w}_{i,M}^k$

| $\hat{w}_{i,M}^k$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Interfering PMI | 1 | 2 | 3 | 0 | 5 | 6 | 7 | 4 | 9 | 10 | 11 | 8 | 13 | 14 | 15 | 12 |
|  | 2 | 3 | 0 | 1 | 6 | 7 | 4 | 5 | 10 | 11 | 8 | 9 | 14 | 15 | 12 | 13 |
|  | 3 | 0 | 1 | 2 | 7 | 4 | 5 | 6 | 11 | 8 | 9 | 10 | 15 | 12 | 13 | 14 |

TABLE 2-2

Example rule for an interference precoder $\hat{w}_{i,M}^k$

| $\hat{w}_{i,M}^k$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Interfering PMI | 1 | 2 | 3 | 0 | 5 | 6 | 7 | 4 | 9 | 10 | 11 | 8 | 13 | 14 | 15 | 12 |
|  | 2 | 3 | 0 | 1 | 6 | 7 | 4 | 5 | 10 | 11 | 8 | 9 | 14 | 15 | 12 | 13 |
| not co-scheduled PMI | 3 | 0 | 1 | 2 | 7 | 4 | 5 | 6 | 11 | 8 | 9 | 10 | 15 | 12 | 13 | 14 |

TABLE 2-3

Example rule for one IMR

| $\hat{w}_{i,M}^k$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Interfering IMR | 0 | 1 | 2 | 3 | 0 | 1 | 2 | 3 | 0 | 1 | 2 | 3 | 0 | 1 | 2 | 3 |

TABLE 2-4

Example rule for multiple IMRs

| $\hat{w}_{i,M}^k$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Interfering IMR | 0 | 1 | 2 | 3 | 0 | 1 | 2 | 3 | 0 | 1 | 2 | 3 | 0 | 1 | 2 | 3 |
|  | 1 | 2 | 3 | 0 | 1 | 2 | 3 | 0 | 1 | 2 | 3 | 0 | 1 | 2 | 3 | 0 |
| Signaling or not co-scheduled IMR | 2 | 3 | 0 | 1 | 2 | 3 | 0 | 1 | 2 | 3 | 0 | 1 | 2 | 3 | 0 | 1 |

The UE assumes that the eNB applies the precoding indicated by the PMI that the UE has reported to the eNB and combines the precoding with the CSI-RS that the UE has received recently so as to determine $\hat{w}_{i,M}{}^k$. The UE can acquire the interfering PMI and IMR corresponding to the estimated $\hat{w}_{i,M}{}^k$ by referencing tables 2-1 and 2-2 based on the determination result. The UE can rule out the interfering PMI and IMR or non-coscheduled PMI and non-coscheduled or non-interference signal component IMR based on the index corresponding to $\hat{w}_{i,M}{}^k$. Referring to Tables 2-1 through 2-4, when the UE selects 7 as the index corresponding to $\hat{w}_{i,M}{}^k$, the precoders corresponding to the PMIs 4, 5, and 6 are the interference precoders in Table 2-1. When generating the channel status information using these interference precoders, it is possible to report the channel status information by paring $\hat{w}_{i,M}{}^k$ with respective interference precoders under the assumption of coscheduling of two UEs or by combining three or four UEs. When selecting interfering PMI in Table 2-2, the precoders corresponding to 4 and 5 are the interference precoders, and the precoder corresponding to 6 is the precoder which is not coscheduled. It is possible to report the channel status information in the form ((interference inclusive 4, interference exclusive 6) and (interference inclusive 5, interference exclusive 6)) as shown in Table 2-1, or according to the number of all available scenarios (e.g., interference inclusive 4, 5, interference exclusive 6). When selecting the interference IMR based on table 2-3, if the UE selects the index 7 corresponding to $\hat{w}_{i,M}{}^k$, the interference IMR is set as IMR 3, so as to generate the channel status information, considering the corresponding IMR signal as interference. Likewise, when using Table 2-4, the IMR to be included in the interference is 3 and 0, and the IMR to be excluded from the interference is 1. In a manner similar to that when using Table 2-2, the channel status information can be reported in the form (interference inclusive IMR 3, interference exclusive IMR 1) and (interference inclusive IMR 0, interference exclusive IMR 1) or according to the number of all available scenarios, (e.g., interference inclusive IMR 3, IMR 0, interference exclusive IMR 1). At this time, each CQI may be in the same form as one wideband CQI or delta CQI. The rule is not limited to the form as shown in Table 2, but can be provided in various forms, e.g., an equation acquired with a specific UE identity (cell ID or CSI ID) and the PMI selected by the UE or groups like (0, 1, 2, 3), (4, 5, 6, 7), . . . , (12, 13, 14, 15) in the case of table 201, such that UE considers the value obtained by subtracting $\hat{w}_{i,M}{}^k$ from the group corresponding to $\hat{w}_{i,M}{}^k$, which UE drives as the interference IMR.

The PMI and IMR information acquisition scheme 2 is a method of transferring the aforementioned rules through RRC signaling. The basic rules may similar to the PMI and IMR information acquisition method 1 specified in the standard. When the basic rules are similar to the PMI and IMR information acquisition method 1, it is possible to configure rules as described herein with reference to Tables 2-1 to 2-4, so as to configure the fields in a manner similar to the fields of the PMI restriction of Rel. 11 and PMIs that can be co-scheduled and to configure the interference-inclusive or interference-exclusive IMRs using the fields configuring the interference-inclusive or interference-exclusive to the respective PMIs. Unlike the aforementioned method, it is possible to provide a direct notification of the PMI and IMR information.

For $\hat{P}_{i,M}{}^k$, when mapping 1, ½, ¼, and ⅛ to an RRC field, 2-bit field is applied for transmission, and the number of bits can be increased or decreased to adjust the control signal overhead and the number of scenarios controllable. This adjustment can also be performed for interfering PMI. For example, if a codebook having 16 indices is used, an interfering PMI can be designated with 4 bits. Accordingly, when using a plurality of interfering PMIs, a plurality of 4-bit fields is required, and if there is any restriction for precoder, the restriction should be specified in the standard, so as to be configured. For the interference IMR, it is possible to use the 16-bit field for configuring the legacy zero-power CSI-RS. It is possible to check whether the corresponding IMR is the interference IMR depending on whether the corresponding field is set to 1 (for considering the corresponding IMR as interference) or 0 (for not considering the corresponding IMR as interference). When any IMR is excluded from the interference and an IMR is included as interference, it is possible to use two fields to check the interference-exclusive IMR too, and, in this case, it should be specified in the standard that the two fields cannot designate the same IMR._The PMI and IMR information acquisition scheme 2 is merely provided as an example and can be modified in accordance with embodiments of the present invention.

The PMI and IMR information acquisition scheme 3 is a method of mapping the corresponding information to the aperiodic CSI trigger table through RRC signaling and transferring the corresponding information using the aperiodic CSI trigger. Tables 3-1 and 3-2 refer to examples of the aperiodic channel state feedback indicator for designating interfering PMI and IMR using the PMI and IMR information acquisition scheme 3.

TABLE 3-1

Interfering PMI designation and aperiodic feedback method using 2-bit aperiodic feedback indicator (CSI Request Field)

| Value of CSI request field | Description |
| --- | --- |
| '00' | No aperiodic MU-CSI report is triggered |
| '01' | Aperiodic CSI report is triggered without interfering PMI |
| '10' | Aperiodic CSI report is triggered with interfering PMI set 1 |
| '11' | Aperiodic CSI report is triggered with interfering PMI set 2 |

TABLE 3-2

IMR designation and aperiodic feedback method using 2-bit aperiodic feedback indicator (CSI Request Field)

| Value of CSI request field | Description |
| --- | --- |
| '00' | No aperiodic MU-CSI report is triggered |
| '01' | Aperiodic CSI report is triggered for sets of CSI process(es) and IMR(s) configured by higher layers for serving cell c |
| '10' | Aperiodic CSI report is triggered for a set of CSI process(es) and $1^{st}$ set of IMR(s) configured by higher layers for serving cell c |
| '11' | Aperiodic CSI report is triggered for a set of CSI process(es) and $2^{nd}$ set of IMR(s) configured by higher layers for serving cell c |

Table 3-1 is used when the eNB instructs the UE to report MU-CSI, as well as the PMI to be regarded as interference, using the PMI and IMR information acquisition scheme 3. The CSI request field is set to '00' to indicate that aperiodic channel status information is not required or '01' to indicate that it is necessary to report channel state in the legacy method using CSI-RS and IMR without additional consideration about interfering PMI as instructed the UE to report the legacy aperiodic channel status information. The CSI request field is set to '10' or '11' to instruct the UE to configure interfering PMI sets 1 and 2 through RRC signaling, to configure the corresponding PMIs as interfering PMIs using aperiodic feedback indicator (CSI Request Field), and to derive interference for the interfering PMIs and consider it along with the IMR. Although Table 3-1 lists only the interfering PMIs, it is possible to configure the table with 'interfering and not co-scheduled PMI set' and distinguish between the PMIs to be included in the interference and the PMIs to be excluded from the interference for the corresponding sets through RRC signaling.

As shown in Table 3-2, the eNB may instruct the UE to report aperiodic channel status information for MU-MIMO operation along with the IMR set for aperiodic channel status information report. Like the method of indicating the offset between SU-PMI and MU-PMI, the CSI request field is set to '00' to indicate that aperiodic channel status information is not required or '01' to instruct to report the channel state in consideration of all IMRs. The CSI request field is set to '10' or '11' to instruct the UE to configure interfering PMI sets 1 and 2 through RRC signaling, to configure the corresponding PMIs as interfering PMIs using aperiodic feedback indicator (CSI Request Field), and to generate the channel status information in consideration of the interferences at the corresponding interference IMRs. Although Table 3-2 lists only the interfering PMIs, it is possible to configure the table with 'interfering and not co-scheduled PMI set' and distinguish between the PMIs to be included in the interference and the PMIs to be excluded from the interference for the corresponding sets through RRC signaling.

Although Tables 3-1 and 3-2 list the 2-bit aperiodic feedback indicators, it is also possible to use 1-bit or 3-bit feedback indicators and, in the case of using a large number of bits, it is possible to integrate the aperiodic feedback indicator (CSI Request Field) for Carrier Aggregation (CA) or Coordinated Multi-Point transmission and reception (CoMP) and the aperiodic feedback indicator for interfering PMI and IMR information, in accordance with embodiments of the present invention.

The PMI and IMR information acquisition scheme 4 is a method used by the eNB to directly notify the UE of the information. When using the PMI and IMR information acquisition scheme 4, a new DCI field is added, and the UE can check the corresponding information based on the new DCI field. For $\hat{P}_{i,M}^{k}$, when mapping 1, ½, ¼, and ⅛ to the DCI field, a 2-bit field is applied for transmission, and the number of bits can be increased or decreased to adjust the control signal overhead and the number of cases controllable. This mapping and adjustment can also be used for interfering PMI, in accordance with embodiments of the present invention. For example, if a codebook having 16 indices is used, an interfering PMI can be designated with 4 bits. Accordingly, when using a plurality of interfering PMIs, a plurality of 4-bit fields is required. Assuming that the number of precoders is limited to 4 in the standard or through RRC signaling, two bits are sufficient to indicate the interfering PMI. For the interference IMR, it is possible to use the 16-bit field for configuring the legacy zero-power CSI-RS. It is possible to check whether the corresponding IMR is the interference IMR depending on whether the corresponding field is set to 1 (for considering it as interference) or 0 (for not considering is as interference).

When there is any IMR excluded from the interference and an IMR is included in the interference, two fields may be used to check the interference-exclusive IMR, too, and, in this scenario, the standard should specify that the two fields cannot designate the same IMR. The PMI and IMR information acquisition scheme 4 is just an example of implementation that can be modified in accordance with embodiments of the present invention.

In the above examples, the interferences indicated by IMR and PMI are combined in the ratio of 1:1 or a predetermined ratio according to Equation (8).

$$I_{total} = \alpha \cdot I_A + I_B \quad (8)$$

In Equation (8), α is a fixed value defined in the LTE/LTE-A standard, or a value that the eNB send to the UE through higher layer signaling or physical layer signaling. For example, if α is set to 0, the UE does not consider the interference strength measured based on the interference IMR of PMI in generating channel information. Otherwise if α is set to 1, the UE combines the interference strengths measured at another IMR or in association with PMI with the interference strength measured at the corresponding interference IMR in the ratio of 1:1 to generate the channel status information based thereon.

Figure 17:
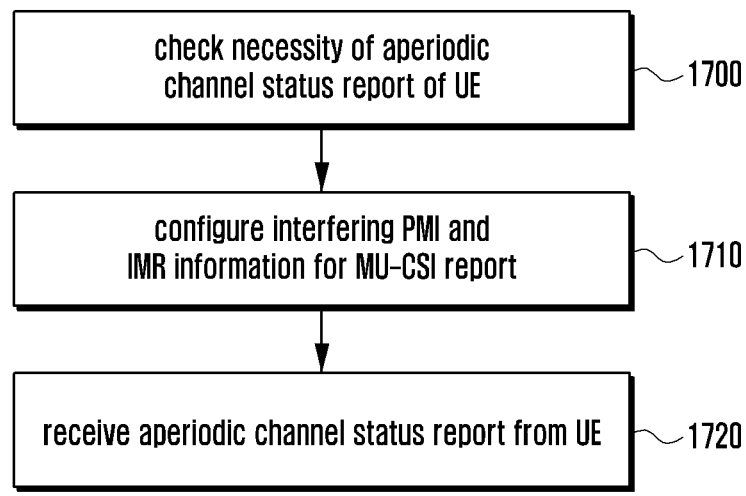
FIG. 17 is a flowchart illustrating a method performed by an eNB to instruct a UE to report MU-CSI according to an embodiment of the present invention.

FIG. 17 is a flowchart illustrating a method performed an eNB to instruct a UE to report MU-CSI according to an embodiment of the present invention.

Referring to FIG. 17, the eNB checks the necessity of MU-CSI report from the UE at step 1700, configures and transmits interfering PMI and IMR information for MU-CSI report at step 1701, and receives the MU-CSI report from the UE at step 1720.

More specifically, at step 1700 of FIG. 17, the eNB checks whether to instruct the UE to report aperiodic channel status information based on MU-CSI in consideration of various factors such as periodic and aperiodic channel status information reported by the UE previously, channel status information items reported by other UEs, and a load of the current eNB. At step 1710, the eNB determines whether to configure the interfering PMI and IMR information for a MU-CSI report based on the result of the check performed at step 1700, and transmits the required information to the UE through RRC or Layer 1 (L1) signaling. At step 1720, the eNB receives the MU-CSI information from the UE in response to the aperiodic channel status information report command.

Figure 18:
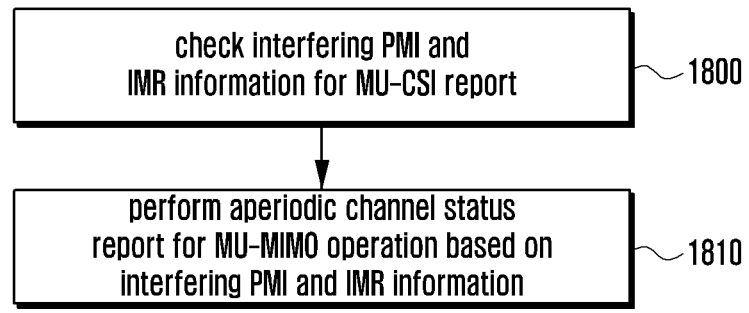
FIG. 18 is a flowchart illustrating a method performed by a UE to report MU-CSI to an eNB according to an embodiment of the present invention.

FIG. 18 is a flowchart illustrating a method performed by a UE to report MU-CSI to an eNB according to an embodiment of the present invention.

Referring to FIG. 18, the UE receives the interfering PMI and IMR information for MU-CSI report from the eNB, at step 1800, and reports MU-CSI to the eNB based on the interfering PMI and IMR information, at step 1810.

More specifically, at step 1800 of FIG. 18, the UE receives the interfering PMI and IMR information for MU-CSI report from the eNB. At step 1810, the UE generates channel status information based on the interfering PMI and IMR information received from the eNB and transmits the channel status information to the eNB.

Figure 19:
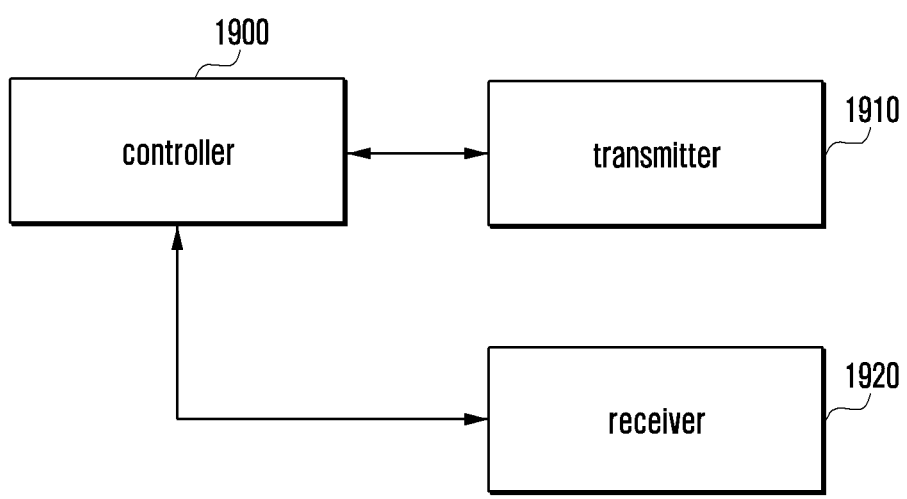
FIG. 19 is a block diagram illustrating a configuration of an eNB according to an embodiment of the present invention.

FIG. 19 is a block diagram illustrating a configuration of an eNB according to an embodiment of the present invention.

As shown in FIG. 19, the eNB includes a controller 1900, a transmitter 1910, and a receiver 1920. The controller 1900 controls the transmitter 1910 to transmit the interfering PMI and IMR information for MU-CSI of the UE, which is generated in consideration of the periodic and aperiodic channel status information report, traffic, and mobility of the UEs served by the eNB. The controller 1900 controls the transmitter 1910 to transmit the information for a channel status information report. The controller 1900 controls the receiver 1920 to receive the channel status information transmitted by the UE. The controller 1900 determines whether the received channel status information is valid. If the channel status information is valid, the controller 1900 applies the channel status information to downlink radio resource management.

Figure 20:
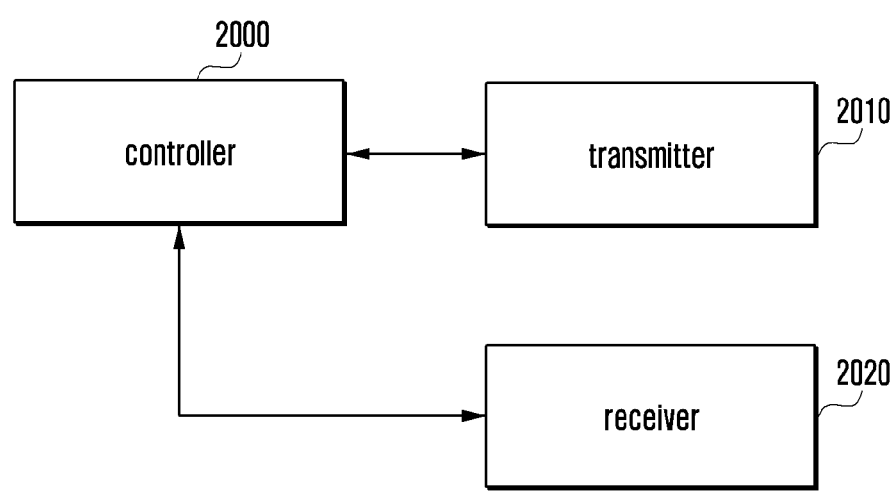
FIG. 20 is a block diagram illustrating a configuration of the UE according to an embodiment of the present invention.

FIG. 20 is a block diagram illustrating a configuration of a UE according to an embodiment of the present invention.

As shown in FIG. 20, the UE includes a controller 2000, a transmitter 2010, and a receiver 2020.

In FIG. 20, the controller 2000 controls the receiver 2020 to receive the interfering PMI and IMR information for an MU-CSI report from the eNB. The controller 2000 controls the receiver 2020 to receive downlink signal and generates the CSI report based on the interfering PMI and IMR information. The channel status information is transmitted to the eNB via the transmitter 2010.

As described above, through an interference measurement method and apparatus according to an embodiment of the present invention, a UE is capable of generating the channel status information reflecting the MU-MIMO interference incurred by a serving eNB that transmits a PDSCH to the UE, as well as the interferences incurred by other eNBs in the mobile communication system supporting MU-MIMO transmission mode. An interference measurement method and apparatus according to an embodiment of the present invention, also guarantees optimized system throughput by determining the data rate adaptive to the channel condition of the UE.

While the present invention has been shown and described with reference to various embodiments thereof, it should be understood by those skilled in the art that many variations and modifications of the method and apparatus described herein will still fall within the spirit and scope of the present invention as defined in the appended claims and their equivalents.

What is claimed is:

1. A method for acquiring channel status information (CSI) by a base station, the method comprising:
identifying whether a plurality of interference measurement resources (IMRs) are assigned to a terminal;
generating interference measurement configuration information for measuring interference in a multi-user multiple-input multiple-output (MU-MIMO) mode based on the identification, the interference being caused by signals transmitted from a serving base station of the terminal to at least one other terminal;
transmitting the generated interference measurement configuration information to the terminal; and
receiving CSI generated using the transmitted interference measurement configuration information from the terminal,
wherein the interference measurement configuration information comprises selection information for selecting at least two IMRs among the plurality of IMRs, the at least two IMRs being used to generate the channel status information in a case that the plurality of IMRs are assigned to the terminal, and wherein the at least two IMRs include a first IMR for measuring the interference in the MU-MIMO mode and a second IMR to be excluded from the interference in the MU-MIMO mode,
wherein the interference in the MU-MIMO mode is calculated by adding the signals addressed to the at least one other terminal and removing a signal addressed to the terminal, in a case that a single IMR is assigned to the terminal, and
wherein a CSI-process is configured with a channel status information reference signal (CSI-RS) and the plurality of IMRs to report the CSI by combining the CSI-RS and the plurality of IMRs.

2. The method of claim 1, wherein the interference measurement configuration information is transmitted through Radio Resource Control (RRC) signaling.

3. The method of claim 1, wherein the interference measurement configuration information is transmitted via an aperiodic feedback indicator.

4. A base station for acquiring channel status information (CSI), the base station comprising:
a transceiver; and
a controller coupled to the transceiver and configured to control to:
identify whether a plurality of interference measurement resources (IMRs) are assigned to a terminal;
generate interference measurement configuration information for measuring interference in a multi-user multiple-input multiple-output (MU-MIMO) mode based on the identification, the interference being caused by signals transmitted from a serving base station of the terminal to at least one other terminal;
transmit the interference measurement configuration information to the terminal; and
receive CSI generated using the transmitted interference measurement configuration information from the terminal,
wherein the interference measurement configuration information comprises selection information for selecting at least two IMRs among the plurality of IMRs, the at least two IMRs being used to generate the channel status information in a case that the plurality of IMRs are assigned to the terminal, and wherein the at least two IMRs include at first IMR for measuring the interference in the MU-MIMO mode and a second IMR to be excluded from the interference in the MU-MIMO mode,
wherein the interference in the MU-MIMO mode is calculated by adding the signals addressed to the at least one other terminal and removing a signal addressed to the terminal, in case that a single IMR is assigned to the terminal, and
wherein a CSI-process is configured with a channel status information reference signal (CSI-RS) and the plurality of IMRs to report the CSI by combining the CSI-RS and the plurality of IMRs.

5. The base station of claim 4, wherein the interference measurement configuration information is transmitted through radio resource control (RRC) signaling.

6. The base station of claim 4, wherein the interference measurement configuration information is transmitted via an aperiodic feedback indicator.

* * * * *